(12) United States Patent
Joshi et al.

(10) Patent No.: US 11,706,450 B2
(45) Date of Patent: Jul. 18, 2023

(54) PARTIAL DECODING AND RECONSTRUCTION OF A VIDEO-BASED POINT CLOUD COMPRESSION BITSTREAM

(71) Applicant: Samsung Electronics Co., Ltd., Suwon-si (KR)

(72) Inventors: Rajan Laxman Joshi, San Diego, CA (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 17/447,674

(22) Filed: Sep. 14, 2021

(65) Prior Publication Data

US 2022/0094980 A1 Mar. 24, 2022

Related U.S. Application Data

(60) Provisional application No. 63/080,424, filed on Sep. 18, 2020.

(51) Int. Cl.
*H04N 19/597* (2014.01)
*H04N 19/174* (2014.01)
(Continued)

(52) U.S. Cl.
CPC ......... *H04N 19/597* (2014.11); *H04N 19/136* (2014.11); *H04N 19/167* (2014.11);
(Continued)

(58) Field of Classification Search
CPC .. H04N 19/597; H04N 19/136; H04N 19/167; H04N 19/174; H04N 19/184; H04N 19/70
See application file for complete search history.

(56) References Cited

U.S. PATENT DOCUMENTS

2019/0139266 A1 5/2019 Budagavi et al.
2019/0327467 A1* 10/2019 Chou .................. H04N 19/177
(Continued)

FOREIGN PATENT DOCUMENTS

KR 10-2019-0053129 A 5/2019
KR 10-2020-0007733 A 1/2020

OTHER PUBLICATIONS

Convenor, ISO/IEC JTC 1/SC 29/WG 11, "ISO/IEC FDIS 23090-5 Visual Volumetric Video-based Coding and Video-based Point Cloud Compression", Sep. 21, 2020, 352 pages.
(Continued)

*Primary Examiner* — Fabio S Lima

(57) ABSTRACT

A decoding device for point cloud decoding includes a communication interface and a processor. The communication interface configured to receive a bitstream. The processor is configured to identify, from the bitstream, messages and one or more sub-bitstreams representing a three-dimensional (3D) point cloud. The processor is configured to identify a query label indicating an object of the 3D point cloud for decoding. In response to determining that the query label corresponds to a label, the processor is configured to identify a 3D scene object associated with the query label. The processor is configured to identify a 2D tile that correspond to the 3D scene object. The processor is configured to determine to decode, based on an identification of the 2D tile from the sub-bitstream, a portion of the sub-bitstream corresponding to the 2D tile to generate a portion of a video frame representing a portion of the 3D scene object.

20 Claims, 16 Drawing Sheets

(51) Int. Cl.
  *H04N 19/136* (2014.01)
  *H04N 19/167* (2014.01)
  *H04N 19/184* (2014.01)
  *H04N 19/70* (2014.01)
(52) U.S. Cl.
  CPC ......... *H04N 19/174* (2014.11); *H04N 19/184* (2014.11); *H04N 19/70* (2014.11)

(56) References Cited

U.S. PATENT DOCUMENTS

| | | | | |
|---|---|---|---|---|
| 2020/0043182 | A1 | 2/2020 | Janus et al. | |
| 2020/0043217 | A1 | 2/2020 | Cilingir et al. | |
| 2020/0107028 | A1* | 4/2020 | Vosoughi | H04N 19/167 |
| 2020/0226792 | A1 | 7/2020 | Wang et al. | |
| 2021/0006833 | A1* | 1/2021 | Tourapis | G06T 9/001 |
| 2021/0049828 | A1* | 2/2021 | Park | H04N 19/182 |
| 2021/0104090 | A1* | 4/2021 | Hur | H04N 19/597 |
| 2021/0209807 | A1* | 7/2021 | Oh | G06T 9/00 |
| 2021/0217200 | A1* | 7/2021 | Oh | G06T 9/001 |
| 2021/0227232 | A1* | 7/2021 | Oh | H04N 21/4728 |
| 2021/0233278 | A1* | 7/2021 | Kuma | H04N 19/85 |
| 2021/0264641 | A1* | 8/2021 | Iguchi | H03M 7/6005 |
| 2021/0295567 | A1* | 9/2021 | Lee | H04N 19/129 |
| 2021/0320961 | A1* | 10/2021 | Lee | H04L 63/0428 |
| 2021/0343069 | A1* | 11/2021 | Takahashi | H04N 19/70 |
| 2021/0409768 | A1* | 12/2021 | Joshi | H04N 19/119 |
| 2022/0051443 | A1* | 2/2022 | Hamza | H04N 19/70 |
| 2022/0058834 | A1* | 2/2022 | Iguchi | H04N 19/597 |
| 2022/0217342 | A1* | 7/2022 | Hannuksela | H04N 19/174 |

OTHER PUBLICATIONS

International Search Report and Written Opinion dated Jan. 4, 2022 regarding International Application No. PCT/KR2021/012864, 8 pages.

* cited by examiner

PARTIAL DECODING AND RECONSTRUCTION OF A VIDEO-BASED POINT CLOUD COMPRESSION BITSTREAM

CROSS-REFERENCE TO RELATED APPLICATION AND CLAIM OF PRIORITY

This application claims priority under 35 U.S.C. § 119(e) to U.S. Provisional Patent Application No. 63/080,424 filed on Sep. 18, 2020. The above-identified provisional patent application is hereby incorporated by reference in its entirety.

TECHNICAL FIELD

This disclosure relates generally to multimedia data. More specifically, this disclosure relates to partial decoding and reconstruction of a video-based point cloud compression bitstream.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds, can be used in the immersive environment.

Point clouds are a set of points in 3D space that represent an object. Point clouds are common in a variety of applications such as gaming, 3D maps, visualizations, medical applications, augmented reality, virtual reality, autonomous driving, multi-view replay, 6 degrees of freedom (6DoF) immersive media, to name a few. Point clouds, if uncompressed, generally require a large amount of bandwidth for transmission. Due to the large bitrate requirement, point clouds are often compressed prior to transmission. Compressing a 3D object such as a point cloud often requires specialized hardware. To avoid specialized hardware to compress a 3D point cloud, a 3D point cloud can be manipulated onto traditional two-dimensional (2D) video frames that can be compressed and reconstructed on a different device in order to be viewed by a user.

SUMMARY

This disclosure provides partial decoding and reconstruction of a video-based point cloud compression bitstream.

In one embodiment, a decoding device is provided. The decoding device is for point cloud decoding and includes a communication interface and a processor. The communication interface is configured to receive a bitstream. The processor is configured to identify, from the bitstream, messages and one or more sub-bitstreams representing a three-dimensional (3D) point cloud, wherein a sub-bitstream of the one or more sub-bitstreams includes independently encoded tiles. The processor is also configured to identify a query label indicating an object of the 3D point cloud for decoding. In response to determining that the query label corresponds to a label included in the messages, the processor is configured to identify a 3D scene object associated with the query label based on the label. The processor is further configured to identify a 2D tile that correspond to the 3D scene object, the 2D tile is one of the independently encoded tiles. Additionally, the processor is configured to determine to decode, based on an identification of the 2D tile from the sub-bitstream, a portion of the sub-bitstream corresponding to the 2D tile to generate a portion of a video frame representing a portion of the 3D scene object.

In another embodiment a method for point cloud decoding is provided. The method includes receiving a bitstream. The method also includes identifying, from the bitstream, messages and one or more sub-bitstreams representing a three-dimensional (3D) point cloud, wherein a sub-bitstream of the one or more sub-bitstreams includes independently encoded tiles. The method further includes identifying a query label indicating an object of the 3D point cloud for decoding. In response to determining that the query label corresponds to a label included in the messages, the method includes identifying a 3D scene object associated with the query label based on the label. Additionally, the method includes identifying a 2D tile that correspond to the 3D scene object, the 2D tile is one of the independently encoded tiles. The method also includes determining to decode, based on an identification of the 2D tile from the sub-bitstream, a portion of the sub-bitstream corresponding to the 2D tile to generate a portion of a video frame representing a portion of the 3D scene object.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
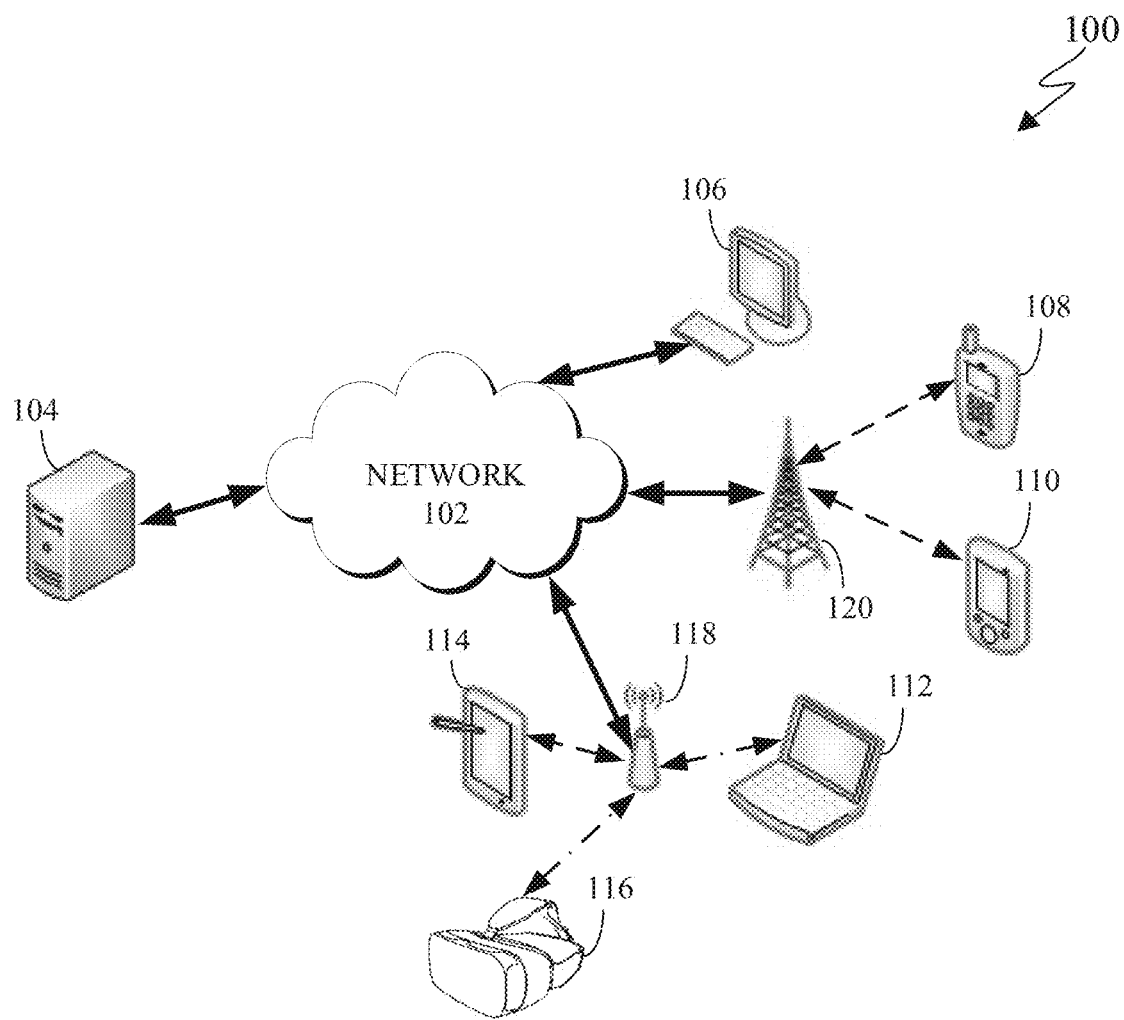
FIG. 1 illustrates an example communication system in accordance with an embodiment of this disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Visual volumetric video based coding (V3C) is a mechanism for encoding and decoding visual volumetric data. For example, V3C converts media from a 3D representation to multiple 2D representations. Video based point cloud compression (V-PCC) is based on V3C, but includes additional processes such as post decoding, pre-reconstruction, post-reconstruction, and adaptation.

Virtual reality (VR) is a rendered version of a visual scene, where the entire scene is computer generated. Augmented reality (AR) is an interactive experience of a real-world environment where objects that reside in the real-world environment are augmented with virtual objects, virtual information, or both. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to detected head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). An HMD represents one of many types of devices that provide AR and VR experiences to a user. An HMD is a device that enables a user to view the VR scene and adjust the displayed content based on movements of the head of the user. Typically, an HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point is positioned at a particular geometric location within 3D space. In addition to a point having a geometric location, the points can include zero or more attributes (such as color, texture, reflectance, intensity, normal, material properties, motion, and the like). A point cloud can be similar to a virtual object in a VR or AR environment. A mesh is another type of a virtual representation of an object in a VR or AR environment. A point cloud or a mesh can be an object, multiple objects, a virtual scene (which includes multiple objects), and the like. As described above, point clouds and meshes are commonly used in a variety of applications, including gaming, 3D mapping, visualization, medicine, AR, VR, autonomous driving, multi-view replay, 6 DoF immersive media, to name a few. As used herein, the terms point cloud, 3D point cloud, 3D mesh, and mesh are used interchangeably.

Point clouds represent volumetric visual data. Point clouds consist of multiple points positioned in 3D space, where each point in a 3D point cloud includes a geometric position represented by 3-tuple (X, Y, Z) coordinate values. When each point is identified by the three coordinates, a precise location in 3D environment or space is identified. The location in a 3D environment or space of each point can be relative to an origin, other points of the point cloud, or a combination thereof. The origin is a location where the X, Y, and Z axis intersect. In certain embodiments, the points are positioned on the external surface of the object. In other embodiments, the points are positioned throughout both the internal structure and external surface of the object.

In addition to the geometric position of a point (the location of the point in 3D space), each point in the point cloud can also include zero or more attributes such as color, texture, reflectance, intensity, surface normal, and the like. In some embodiments, a single point of a 3D point cloud can have no attributes. In other embodiments, a single point of a 3D point cloud can have one or more attributes. In some applications, point clouds can also be used to approximate light field data in which, each point includes multiple view-dependent, color information (R, G, B or Y, U, V triplets).

A single point cloud can include billions of points, with each point associated with a geometric position and zero or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, an attribute that specifies the color of a single point can consume twenty-four bits. For instance, if a color component of a single point is defined based on a Red value, a Green value, and a Blue value, then each color component (Red, Green, and Blue) uses eight bits, totaling the twenty-four bits. As a result, a single point with a ten-bit geometric data, per coordinate, and an eight-bit color attribute data, per color value, occupies fifty-four bits. Each additional attribute increases the bits required for a single point. If a frame includes one million points (and each point includes geometric data and color attribute data), the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to render and display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point cloud is necessary to reduce the volume of data (bandwidth) that is used when a point cloud is transmitted from one device (such as a source device) to another device (such as a display device or user device). Certain dedicated hardware components can be used to meet the real-time demands or reduce delays or lags in the transmitting and rendering a 3D point cloud; however, such hardware components are often expensive. Additionally, many video codecs are not able to encode and decode 3D video content, such as a point cloud. Compressing and decompressing a 3D point cloud by leveraging existing 2D video codecs enables the encoding and decoding of a point cloud to be widely available without the need for new or specialized hardware. According to embodiments of the present disclosure, when the point cloud is converted from a 3D representation to a 2D representation, existing video codecs can be used to compress and reconstruct a point cloud.

Embodiments of the present disclosure provide systems and methods for converting a 3D point cloud into a 2D representation that can be transmitted and then reconstructed into the 3D point cloud for rendering. An encoder converts an input 3D a point cloud onto multiple 2D frames (such as geometry frames, attribute frames, and occupancy map frames). The 2D frames can represent video frames. The 2D video frames can be encoded (using video codecs such as HEVC, AVC, VP9, VP8, VVC, and the like) to compress the 2D frames for transmission via a bitstream. A decoder receives and decodes the bitstream and then reconstructs the 3D point cloud from the 2D frames such that the 3D point cloud can be rendered, displayed, and then viewed by a user. Embodiments of the present disclosure describe systems and methods for enabling partial decoding of the received bitstream representing a point cloud. Accordingly, a decoder need only decode and render a portion of the received bitstream representing a portion of the point cloud, instead of decoding the entirety of the point cloud.

To convert a 3D point cloud to a 2D representation that can be transmitted using 2D video frames, the point cloud is deconstructed from a 3D state into multiple patches which are packed into the 2D video frames. Points of the 3D point cloud that are represented in one patch in a first frame correspond to the same points that are represented in another patch in a second frame when the two patches are positioned at over the same coordinates. For example, a pixel at the position (u, v) in a frame that represents geometry is the geometry position of a pixel at the same (u, v) position in a frame that represents an attribute such as color. In other embodiments, the patches in one frame represent multiple attributes associated with the points of the point cloud, such as a geometric position of the points in 3D space and color.

To deconstruct a 3D point cloud for transmission from one device to another, the geometric positions of the points of the point cloud are separated from the attribute information of the points. Projections of the 3D point cloud are made with respect to different projection planes, such that the 3D point cloud is separated into multiple clusters of points which are represented as patches on 2D video frames. A first set of frames can include values representing geometry positions of the points. Each additional set of frames can represent different attributes of the point cloud. For example, one attribute frame can include values representing color information associated with each of the points. The patches representing the geometry and attribute information (if present) are packed into geometry video frames and attribute video frames, respectively, where each pixel within any of the patches corresponds to a point in 3D space. The geometry video frames are used to encode the geometry information, and each of the corresponding attribute video frames (if present) are used to encode a corresponding attribute (such as color) of the 3D point cloud.

Figure 4A:
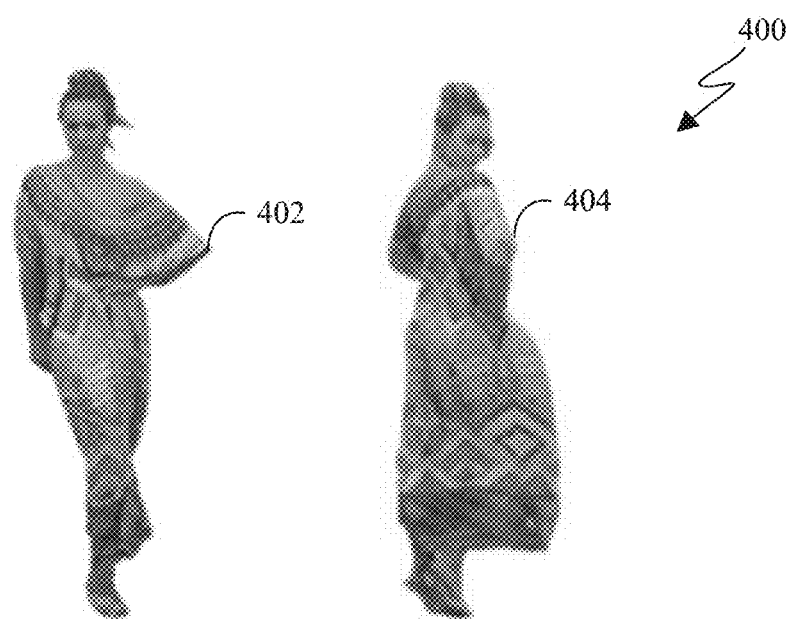
FIG. 4A illustrates an example 3D point cloud in accordance with an embodiment of this disclosure.
Figure 4B:
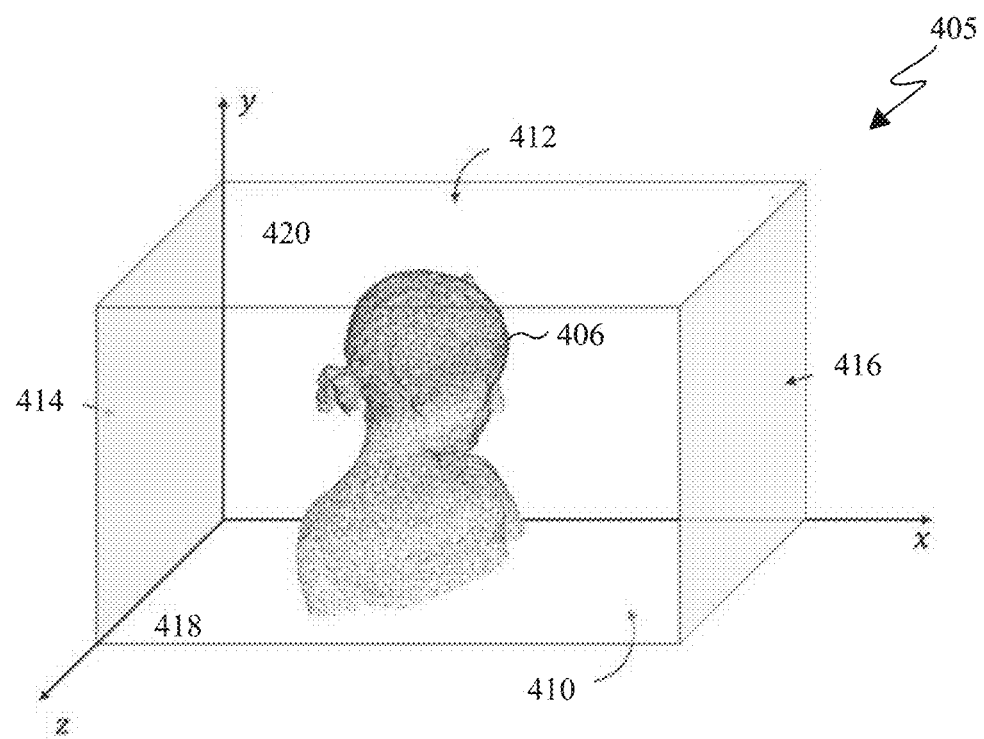
FIG. 4B illustrates a diagram of a point cloud that is surrounded by multiple projection planes in accordance with an embodiment of this disclosure.
Figure 4C:
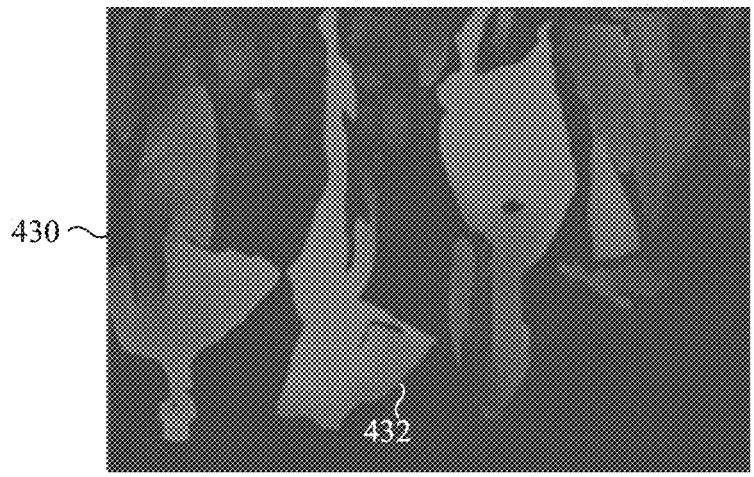
FIGS. 4C and 4D illustrate example 2D frames that include patches representing the 3D point cloud of FIG. 4A in accordance with an embodiment of this disclosure.
Figure 4D:
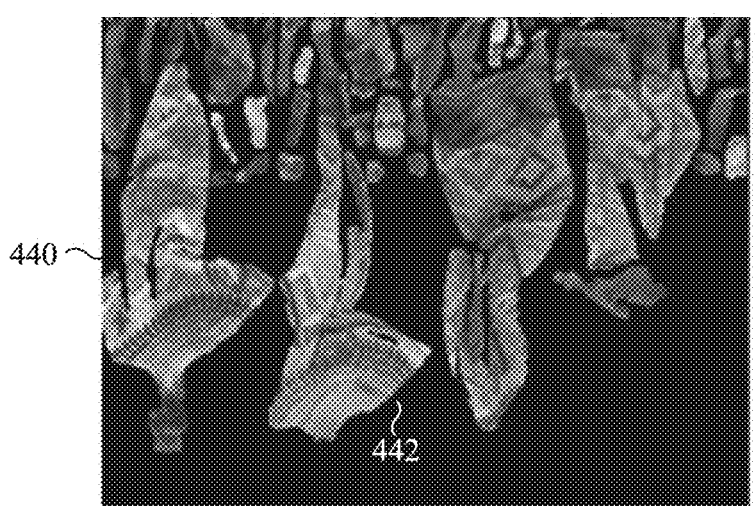

When the point cloud is deconstructed to fit on multiple 2D video frames and compressed, by an encoder, the frames can be transmitted using less bandwidth than used to transmit the original point cloud. FIGS. 4A-4D, which are described in greater detail below, illustrate various stages of projecting a point cloud onto different plans and thereafter storing the projections into 2D frames. For example, FIG. 4A, illustrates two views of a 3D point cloud, illustrating that a point cloud can be a 360° view of an object. FIG. 4B illustrates the process of projecting a 3D point cloud onto different planes. After the point cloud (such as the point cloud of FIG. 4A) is projected onto different planes, FIGS. 4C and 4D illustrate a geometry frame and an attribute frame (which represents the color of the points of the 3D point cloud), respectively, which include patches corresponding to the various projections.

An encoder can distinguish between geometry and attributes associated with the points of a point cloud. The geometry and attributes, of a point cloud are clustered (using some criteria such as normal direction, distance to projected frames, contiguity, and the like) and are projected onto different planes (e.g. XY, YZ, ZX plane). Furthermore, for each projection plane, the points may be projected to a near plane or a far plane. FIG. 4B, discussed in greater detail below, describes the projection planes. Each of the clusters shows up as a patch when projected on a plane. The patches are sorted and packed into 2D video frame(s) storing the geometry. In certain embodiments, there may be zero or more attribute frames associated with each geometry frame. The 2D plane in which the patches are packed is referred to as a canvas. In certain embodiments, there could be multiple points being projected to the same pixel on the canvas, as such, two (or more) maps may be considered for patch projection. In case of multiple maps, for each map, a geometry video is formed. Similarly, for each map and each attribute, an attribute video is formed. Each video is then encoded with a video codec such as HEVC, AVC, VP9, VP8, JVET, AVC or the like.

The geometry video frames are used to encode the geometry coordinates of the points of the 3D point cloud. A location (u, v) of a pixel in the geometry frame and the value of the pixel corresponds to a (X, Y, Z) location of a point in 3D space. For example, the two transverse coordinates (with respect to the projection plane) of a 3D point corresponds to the column and row indices in the geometry video frame (u, v) plus a transverse-offset which determines the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or ZX coordinates.

The encoder can also generate an occupancy map (also referred to an occupancy map frame). The occupancy map shows the location of projected points in the 2D videos frames. For each canvas, there is a single occupancy map that is shared by all the maps. For each pixel on the canvas, the occupancy map specifies whether that pixel is occupied, that is, whether it is part of a patch. The occupancy map shows the location of projected points in the 2D videos frames. For example, since the patches may not occupy the entirety of the generated frames, the occupancy map indicates which pixels of the geometry frame and attribute frame correspond to a point of the point cloud and which pixels are empty/invalid and do not correspond to a point of the point cloud (such as a pixel that represents padding). In certain embodiments, the occupancy map frame is compressed.

After generating the geometry frames and the occupancy map frames, the frames can be compressed by leveraging various video compression codecs, image compression codecs, or both. For example, the encoder first generates and then compresses the geometry frames using a 2D video codec such as HEVC. In certain embodiments, the encoder also encodes the occupancy map frames. In certain embodiments, the encoder smooths the geometry of the reconstructed point cloud. It is noted that based on whether the encoder smooths the geometry of the reconstructed point cloud affects how the decoder reconstructs the 3D point cloud.

To generate an attribute frame (such as the color of the 3D point cloud), in some embodiments, the encoder decodes the encoded geometry frame (and the occupancy map frames if they were encoded) and reconstructs the 3D coordinates of the 3D point cloud. The encoder may interpolate the color values of each point from the color values of original point cloud to the corresponding geometry points of the smoothed geometry or the reconstructed geometry. The interpolated color values are then packed into a color frame which is compressed. Accordingly, the geometry video frames are used to encode the geometry information, and the corresponding attribute video frames are used to encode the attribute (such as color) of the point cloud.

For example, after the geometry frames and occupancy maps are formed, they are coded using a video codec such as HEVC. The geometry frames (and occupancy map videos if they were previously encoded) are decompressed. The encoder then reconstructs the geometry of the 3D point cloud using the decoded geometry frames and the occupancy map video frames. The attribute video frames are generated using the occupancy map frames, the input point cloud, and patch information and the reconstructed geometry of the 3D point cloud.

The encoder can also generate atlas frame(s) (also referred to as an atlas sequence). The atlas frame includes information about the patches in the frames (such as the geometry video frames, the attribute video frames, the occupancy map frames, and the like). The atlas frame can include the positioning of the patches within the 2D frame, the offsets for the patch segment in the 3D point cloud space, the plane on which the patch is projected on, and the like. The atlas frame can include information about the position and size of patches and their orientation in atlas frames, the position and size of the patches in the 3D space as well as certain other properties of the patches.

In certain embodiments, the atlas frame includes 3D information and 2D information. Regarding the 3D information, the atlas frame can specify the 3D locations of a patch, such as the location of a patch in 3D space. The atlas frame can also specify the 3D offset of a patch. Regarding the 2D information, the atlas frame can specify where the patches are located on a grid of a 2D frame, as well as the size of the patch. The atlas frame can also specify additional information related to the patches such as information about the type of patch.

In certain embodiments, any of the video frames (such as the geometry video frames, the attribute video frames, the occupancy map frames, and the like) and the atlas frames are partitioned into tiles. For example, one the video frames can be partitioned into one or more tiles. Similarly, the atlas frames can be partitioned into one or more tiles. For example, if there are 100 patches and the encoder determines to use four tiles, then the patches are divided between the four tiles. The patches can be, but are not required to be, equally divided between the four tiles. For instance, tile 0 can include 10 patches, tile 1 can include 40 patches, tile 2 can include 30 patches, and tile 3 can include 20 patches.

In certain embodiments, there is a relationship between the tiles of the video frames and the tiles of the atlas frame(s). For example, a tile of one of the video frames corresponds to similar location as a tile in the atlas frame. Even if the video frames and the atlas frames are different sizes, the relative position of the tile in the video frames is similar to the relative position of the tile in the atlas frame. The size of a tile in the video frames can also be proportional to the size of a tile in the atlas frame. For example, if a video frame is downsized in both the X and Y coordinates, the size of the tiles in the video frame would be the same size as the tiles in the atlas frame if the video frame is scaled to a nominal size. In this example, if the atlas frame is 1024× 1024 with tiles that are 256×256, and the geometry frame is 512×512 with tiles that are 128×128, if the geometry frame was scaled to be the same size as the atlas frame, then the tiles of the geometry frame would be a similar size (that of 256×256) as the tiles in the atlas frame. A value of a syntax element or message can specify the relationship between tiles of a video frame and tiles of an atlas frame.

Motion can be constrained in the tiles when the frames are compressed. That is, a group of tiles in a frame can be encoded and decoded independently without having to depend on data from other tiles in that frame. For example, HEVC encoding uses a previous frame as a predictor for encoding a current frame. However, when using tiling, HEVC can constrain the motion to within a particular tile. If motion is constrained within tiles of a frame, a motion vector is not directed outside of the tile or group of tiles. In certain embodiments, the motion vector can relate to a similar tile in another frame. By using motion constrained tiles, a decoder can decode individual tiles (or a group of tiles) without referring to data from other tiles (or groups for tiles) of that frame. This enables a decoder to decode only certain portions of a frame, such as one or more tiles, without having to decode the entire frame. The decoder may have to decode a tile from one or more preceding frames due to the encoding process. By enabling a decoder to decode one or more portions of a frame, can save processing power. It is noted that if the encoder determines to use motion contained tiles, then the decoder has the ability to decode only certain tiles. However, if the encoder does not use motion constrained tiles, then the decoder decodes the entire frame.

In certain embodiments, a message or syntax element can be included in the bitstream for indicating the relationship between tiles of the video frames (such as the geometry video frames, the attribute video frames, the occupancy map frames, and the like) and the tiles of the atlas frame. The syntax element enables the decoder, if the decoder determines to perform partial decoding, to determine the relationships between tiles in the atlas frames and tiles in a video frame. For example, the messages or syntax elements also relate various objects of the point cloud to particular tiles and patches to enable the decoder to identify particular portions of a frame to decode and particular patches to be used for reconstructing the point cloud.

The compressed geometry frames, the compressed color frames (and any other attribute frame), the occupancy map frame, and the atlas frames, when encoded are sub-bitstreams that can be multiplexed to generate a bitstream. The encoder or another device then transmits the bitstream that includes the 2D frames to a different device. It is noted that the terms "bitstream," "sub-bitstream," and "substream" may be used interchangeably in the disclosure.

A decoder receives the bitstream, decompresses the bitstream into the frames, and reconstructs the point cloud based on the information within the frames. After the point cloud is reconstructed, the 3D point cloud can be smoothed to improve the visual quality of the 3D point cloud. Thereafter the reconstructed 3D point can be rendered and displayed for a user to observe.

Embodiments of the present disclosure takes into consideration that a decoder may not want to decode an entire point cloud. For example, if a decoder is battery powered, the decoder could extend its battery life when the decoder only decodes content that is to be rendered instead of decoding an entire frame.

Therefore, embodiments of the present disclosure provide systems and methods for partial decoding of the frames and partial reconstruction of the point cloud. Embodiments of the present disclosure also provide systems and methods to use a message to indicate relationships about the 3D objects and their location on the frames.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 receives a 3D point cloud, decomposes the 3D point cloud to fit on 2D frames, compresses the frames to generate a bitstream. The bitstream can be transmitted to a storage device, such as an information repository, or one or more of the client devices 106-116. For another example, one of the client devices 106-116 can receive a 3D point cloud, decompose the 3D point cloud to fit on 2D frames, compress the frames to generate a bitstream that can be transmitted to a storage device, such as an information repository, another one of the client devices 106-116, or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
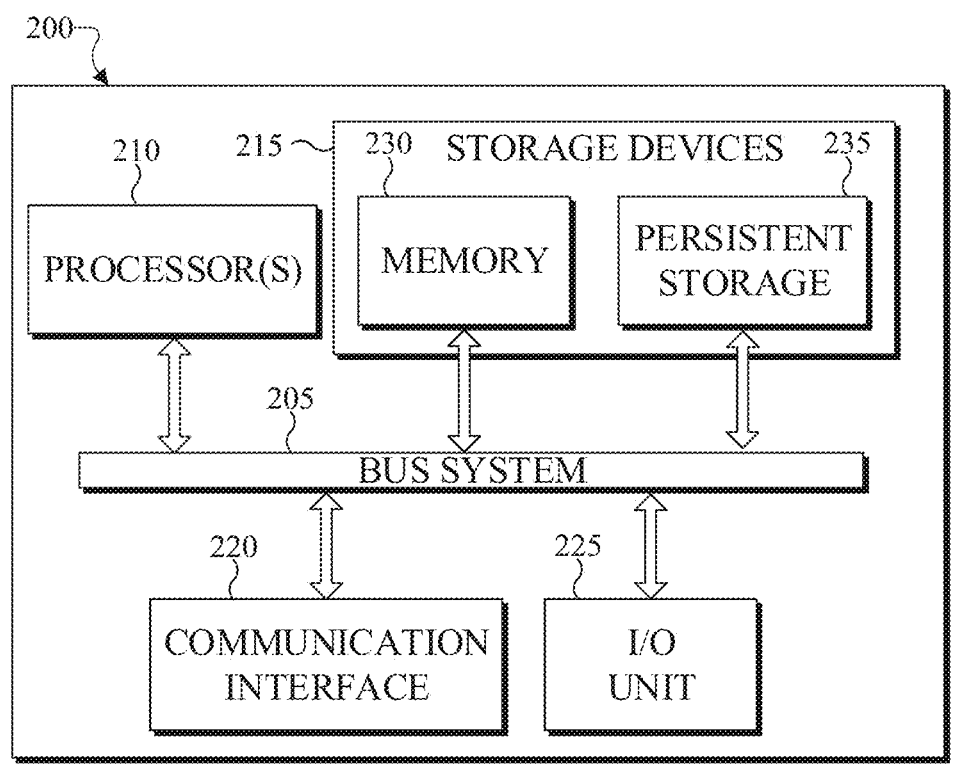
FIGS. 2 and 3 illustrate example electronic devices in accordance with an embodiment of this disclosure.
Figure 3:
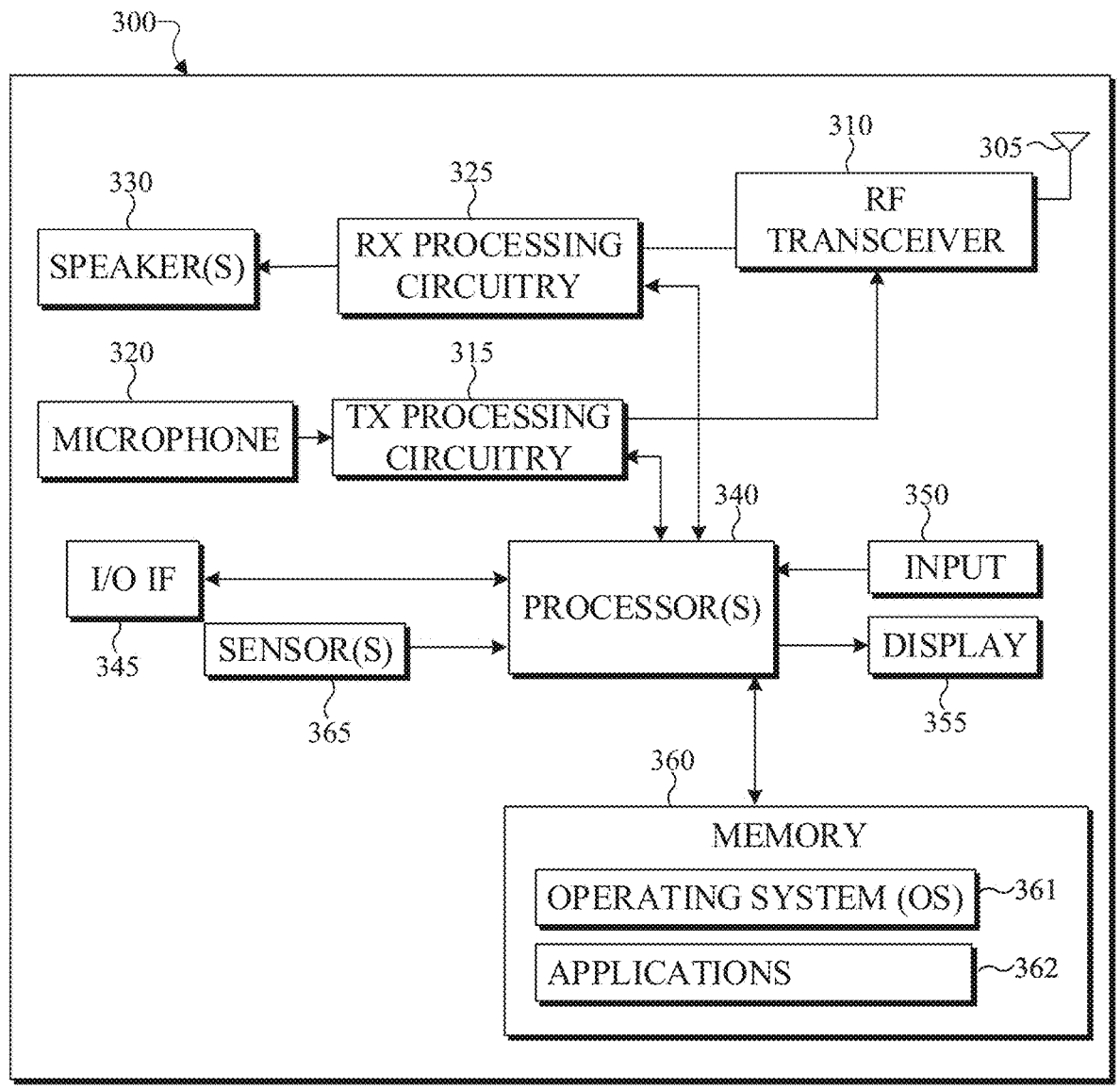

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the server 200 can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, when the 3D point cloud is encoded by an encoder, the encoder also decodes the encoded 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image, or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a 3D point cloud or capture (or record) content through a camera. The electronic device 300 can encode the media content to generate a bitstream (similar to the server 200, described above), such that the bitstream can be transmitted directly to another electronic device or indirectly such as through the network 102 of FIG. 1. The electronic device 300 can receive a bitstream directly from another electronic device or indirectly such as through the network 102 of FIG. 1.

When encoding media content, such as a point cloud, the electronic device 300 or the server 200 of FIG. 2 can project the point cloud into multiple patches. For example, a cluster of points of the point cloud can be grouped together and represented as a patch on the 2D frames. A patch can represent a single attribute of the point cloud from a particular map (or layer). Patches that represent the same attribute and belong to the same map can be packed into individual 2D frames, respectively. For example, a particular attribute from all the points belonging to a particular map forms a 2D frame. The 2D frames are then encoded to generate a bitstream. During the encoding process additional content such as metadata, flags, parameter sets, syntax elements, occupancy maps, geometry smoothing parameters, one or more attribute smoothing parameters, an atlas sub-bitstream, and the like can be included in the bitstream.

Similarly, when decoding media content included in a bitstream that represents a 3D point cloud, the electronic device 300 decodes the received bitstream into frames. In certain embodiments, the decoded bitstream also includes an occupancy map, 2D frames, auxiliary information (such as one or more flags, one or more syntax elements, or quantization parameter size), and the like. A geometry frame can include pixels that indicate geographic coordinates of points of the point cloud in 3D space. Similarly, an attribute frame can include pixels that indicate the RGB (or YUV) color (or any other attribute) of each geometric point in 3D space. The auxiliary information can include one or more flags, one or more syntax elements, or quantization parameter size, one or more thresholds, geometry smoothing parameters, one or more attribute smoothing parameters, or any combination thereof. After reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

FIGS. 4A, 4B, 4C, and 4D illustrate various stages in generating frames that represent a 3D point cloud. In particular, FIG. 4A illustrate an example 3D point cloud 400 in accordance with an embodiment of this disclosure. FIG. 4B illustrates a diagram 405 of a point cloud that is surrounded by multiple projection planes in accordance with an embodiment of this disclosure. FIGS. 4C and 4D illustrate 2D frames that include patches representing the 3D point cloud 400 of FIG. 4A in accordance with an embodiment of this disclosure. For example, the FIG. 4C illustrates a 2D frame 430 that represents the geometric position of points of the 3D point cloud 400, while the FIG. 4D illustrates the frame 440 that represents the color associated with points of the 3D point cloud 400. In certain embodiments, the reconstructed point cloud 450 represents the 3D point cloud 400 of FIG. 4A, but reconstructed for rendering on a user device, while the 3D point cloud 400 of FIG. 4A can be located on a server.

The 3D point cloud 400 of FIG. 4A is a set of data points in 3D space. Each point of the 3D point cloud 400 includes a geometric position that provides the structure of the 3D point cloud and one or more attributes that provide information about each point such as color, reflectiveness, material, and the like. The 3D point cloud 400 represents the entire 360° object. That is, the point cloud can be viewed from various angles such as the front 402, the sides, and the back 402, the top, the bottom.

The diagram 405 of FIG. 4B includes a point cloud 406. The point cloud 406 can be similar to the 3D point cloud 400 of FIG. 4A. That is, the point cloud 406 represents an entire 360° object. The point cloud 406 is surrounded by multiple projection planes, such as the projection plane 410, 412, 414, 416, 418, and 420. The projection plane 410 is separated from the projection plane 412 by a predefined distance. For example, the projection plane 410 corresponds to the projection plane XZ0 and the projection plane 412 corresponds to the projection plane XZ1. Similarly, the projection plane 414 is separated from the projection plane 416 by a predefined distance. For example, the projection plane 414 corresponds to the projection plane YZ0 and the projection plane 416 corresponds to the projection plane YZ1. Additionally, the projection plane 418 is separated from the projection plane 420 by a predefined distance. For example, the projection plane 418 corresponds to the projection plane XY0 and the projection plane 420 corresponds to the projection plane XY1. It is noted that additional projection planes can be included and the shape that the projection planes form can differ.

During the segmentation process, each of the points of the point cloud 406 are assigned to a particular projection plane, (such as the projection planes 410, 412, 414, 416, 418, and 420). The points that are near each other and are assigned to the same projection plane are grouped together to form a cluster which is represented as a patch such as any of the patches as illustrated in FIGS. 4C and 4D. More or less projection planes can be used when assigning points to a particular projection plane. Moreover, the projection planes can be at various locations and angles. For example, certain projection planes can be at a 45 degree incline with respect to the other projection planes, Similarly, certain projection planes can be at a 90 degree angle with respect to other projection planes.

FIGS. 4C and 4D illustrate the 2D frames 430 and 440, respectively. The frame 430 is a geometry frame as it illustrates the geometric location of each point of the 3D point cloud 400 of FIG. 4A. The frame 430 includes multiple patches (such as a patch 432) representing the depth values of the 3D point cloud 400. The value of each pixel in the frame 430 is represented as a lighter or darker color and corresponds to a distance each pixel is from a particular projection plane (such as one of the projection planes 410, 412, 414, 416, 418, and 420 of FIG. 4B).

The frame 440 is a color frame (one type of attribute) as it provides the color of each point of the 3D point cloud 400 of FIG. 4A. The frame 440 includes multiple patches (such as a patch 442) representing values corresponding to the color of a point in the 3D point cloud 400.

Each of the patches in FIGS. 4C and 4D can be identified by an index number. Similarly, each pixel within a patch can be identified by its location within the frame as well as the index number of the patch to which the pixel is within. The patch index number can be stored in an atlas frame.

A correspondence (or mapping) exists between the frame 430 and the frame 440. That is, each pixel in the frame 430 corresponds to a pixel at the same location in the frame 440. Each pixel of color in the frame 440 corresponds to a particular geometry pixel in the frame 430. For example, a mapping is generated between each pixel in the frame 430 and the frame 440. For example, each pixel within the patch 432 corresponds to a point in 3D space, and each pixel within the patch 442 provides a color to a point of the 3D point cloud that is represented at the same location in the patch 432. As shown in the frames 430 and 440, some of the pixels correspond to valid pixels that represent the 3D point cloud 400 while other pixels (the black area in the background) correspond to invalid pixels that do not represent the 3D point cloud 400. In certain embodiments, the black area in the background could be filled with values for padding purposes. In certain embodiments, geometry frames (such as the frame 430), attribute frames (such as the frame 440), and occupancy map frames can be down sampled, so the correspondence does not match up exactly.

In certain embodiments, the frames 430 and 440 could be partitioned into multiple units known as tiles. To apply tiles in the frames 430 and 440, the encoder determines locations for vertical and horizontal lines to form the video tiles.

The frames 430 and 440 can be encoded with a video codec such as HEVC, AVC, VP9, VP8, VVC, AV1, and the like. A decoder receives a bitstream that includes the frames 430 and 440 and reconstructs the geometry of the 3D point cloud from the frame 430 and colors the geometry of the point cloud based on the frame 440 in order to generate the reconstructed point cloud. In certain embodiments, the when the video frames are encoded, for each corresponding video tile (or a group of tiles), motion is constrained within that video tile (or group of tiles).

Although FIGS. 4A, 4B, 4C, and 4D illustrate example point cloud and 2D frames representing a point cloud, various changes can be made to FIGS. 4A, 4B, 4C, and 4D. For example, a point cloud or mesh can represent a single object, whereas in other embodiments, a point cloud or mesh can represent multiple objects, scenery (such as a landscape), a virtual object in AR, and the like. In another example, the patches included in the 2D frames can represent other attributes, such as luminance, material, and the like. FIGS. 4A, 4B, 4C, and 4D do not limit this disclosure to any particular 3D object(s) and 2D frames representing the 3D object(s).

Figure 5A:
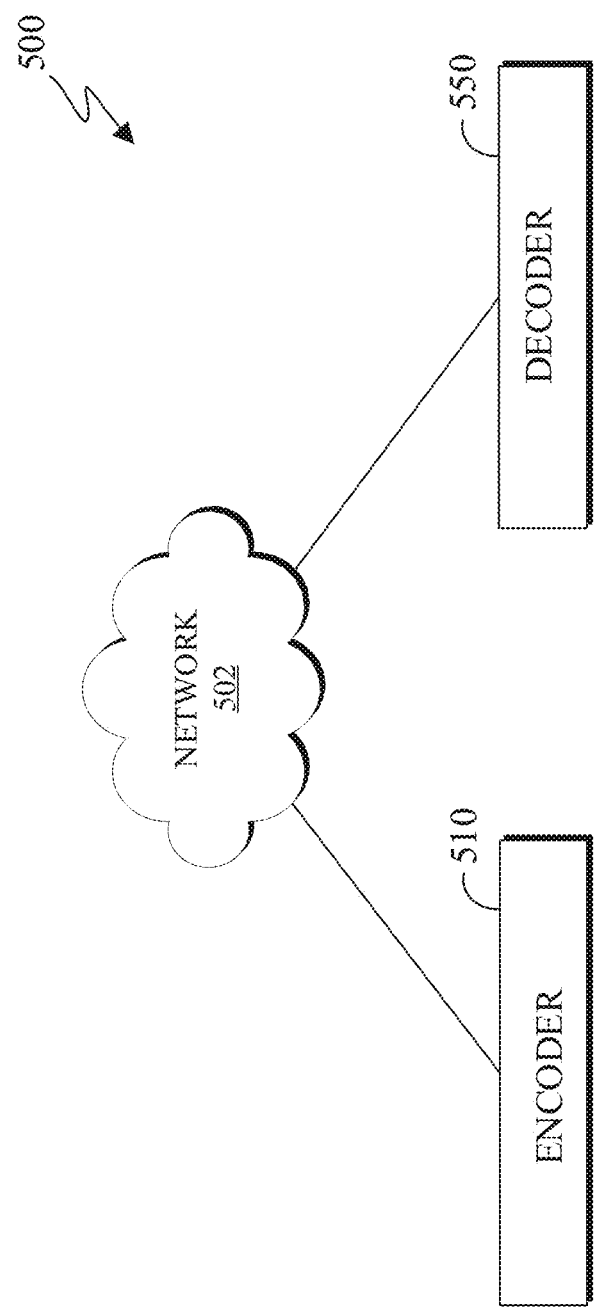
FIG. 5A illustrates a block diagram of an example environment-architecture in accordance with an embodiment of this disclosure.
Figure 5B:
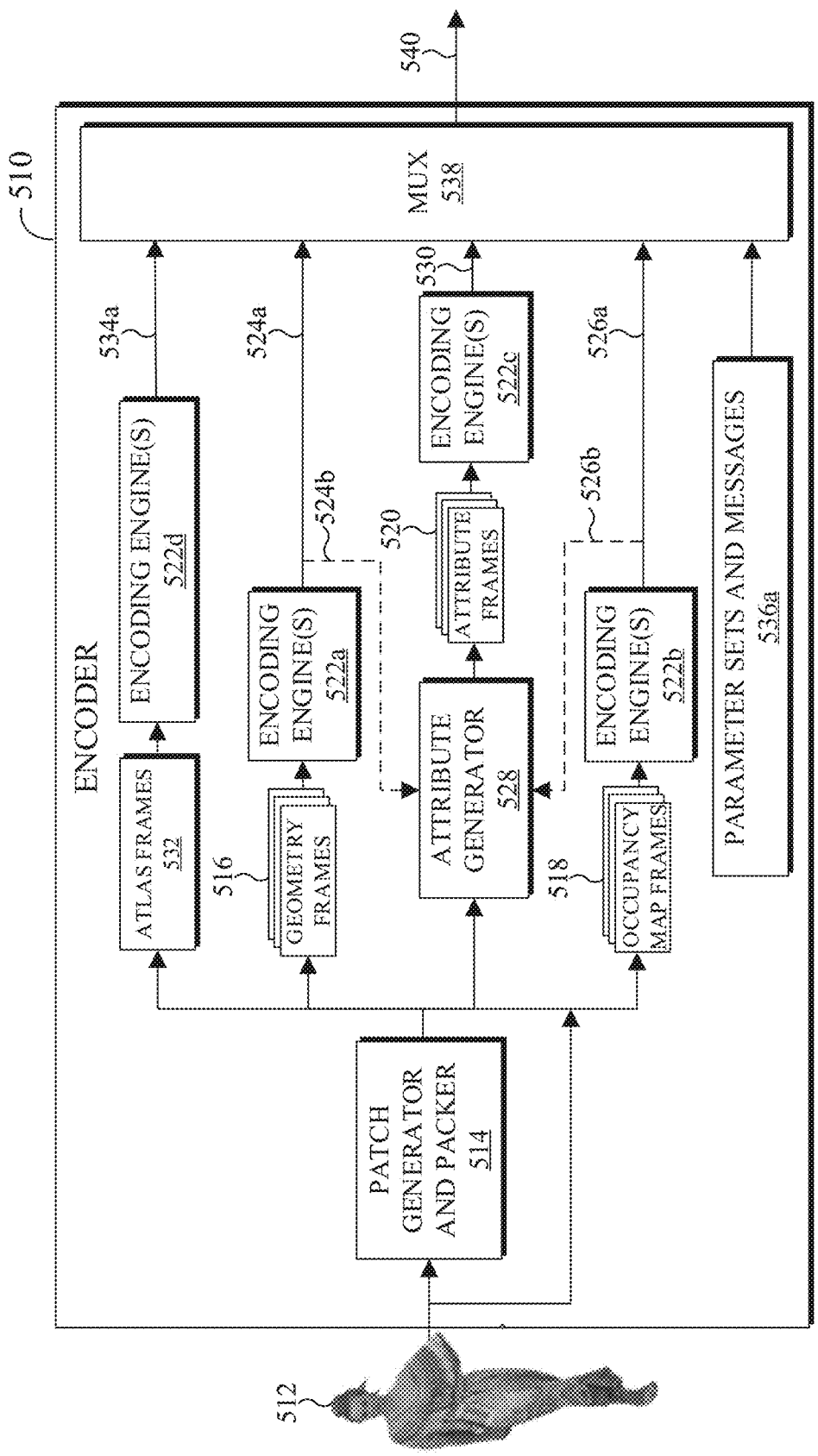
FIG. 5B illustrates an example block diagram of an encoder in accordance with an embodiment of this disclosure.
Figure 5C:
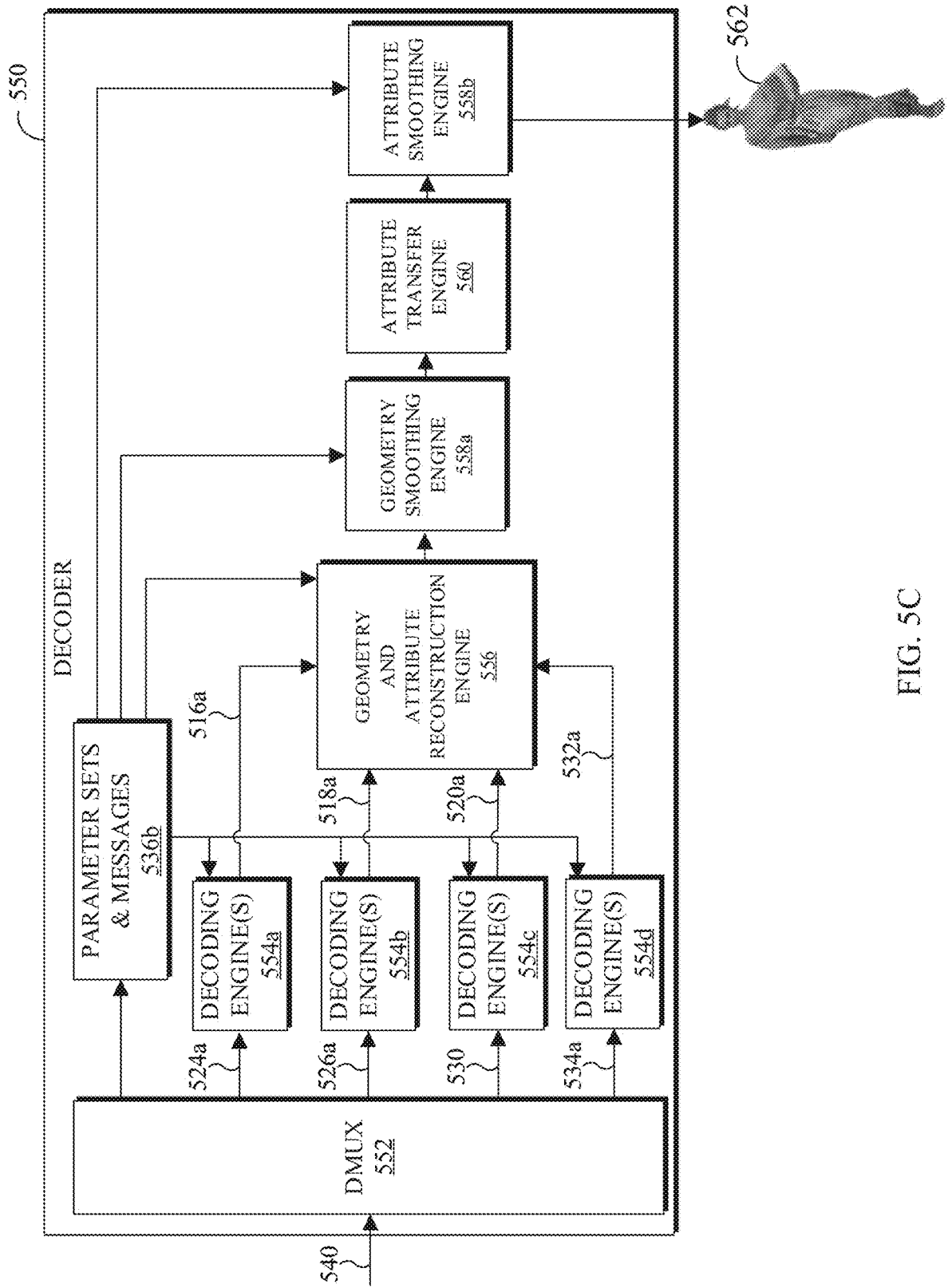
FIG. 5C illustrates an example block diagram of a decoder in accordance with an embodiment of this disclosure.

FIGS. 5A, 5B, and 5C illustrate block diagrams in accordance with an embodiment of this disclosure. In particular, FIG. 5A illustrates a block diagram of an example environment-architecture 500 in accordance with an embodiment of this disclosure. FIG. 5B illustrates an example block diagram of the encoder 510 of FIG. 5A and FIG. 5C illustrates an example block diagram of the decoder 550 of FIG. 5A in accordance with an embodiment of this disclosure. The embodiments of FIGS. 5A, 5B, and 5C are for illustration only. Other embodiments can be used without departing from the scope of this disclosure.

As shown in FIG. 5A, the example environment-architecture 500 includes an encoder 510 and a decoder 550 in communication over a network 502. The encoder 510 is described in greater detail in FIG. 5B, below. The decoder 550 is described in greater detail in FIG. 5C, below.

The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, the server 200 of FIG. 2, the electronic device 300 of FIG. 3, or another suitable device. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device. In certain embodiments, the encoder 510 and the decoder 550 are the same device or operably connected to the same device.

Generally, the encoder 510, as shown in FIGS. 5A and 5B, receives 3D media content, such as a point cloud 512, from another device such as a server (similar to the server 104 of FIG. 1, the server 200 of FIG. 2), an information repository (such as a database), or one of the client devices 106-116. In certain embodiments, the encoder 510 can receive media content from multiple cameras and stitch the content together to generate a 3D scene that includes one or more point clouds.

The encoder 510 projects points of the point cloud into multiple patches that represent the projection. The encoder 510 clusters points of a point cloud into groups which are projected onto different planes such as an XY plane, an YZ plane, and an ZX plane. Each cluster of points is represented by a patch when projected onto a plane. The encoder 510 packs the patches representing the point cloud onto 2D frames. The 2D frames can be video frames. It is noted, a point of the 3D point cloud is located in 3D space based on a (X, Y, Z) coordinate value, but when the point is projected onto a 2D frame, the pixel representing the projected point is denoted by the column and row index of the frame indicated by the coordinate (u, v). The value of the pixel represents an element associated with the point cloud. For example, the value of the pixel could be a color value. The value of the pixel could be a distance corresponding to the distance between the point and a projection plane. Additionally, 'u' and 'v' can range from zero to the number of rows or columns in the depth image, respectively.

Each of the 2D frames (such as the geometry frames 516 and the attribute frames 520) represents a particular aspect of the point cloud, such as one set of frames can represent geometry and another set of frames can represent an attribute (such as color). It should be noted that additional frames can be generated based on more layers as well as each additionally defined attribute.

The encoder 510 also generates an occupancy map frames 518 based on the geometry frames 516 to indicate which pixels within the frames are valid. Generally, the occupancy map indicates, for each pixel within a frame, whether the pixel is a valid pixel or an invalid pixel. For example, if a pixel in the occupancy map at coordinate (u, v) is valid, then the corresponding pixel in a geometry frame and the corresponding attribute frame at the coordinate (u, v) are also valid. If the pixel in the occupancy map at coordinate (u, v) is invalid, then the decoder skips the corresponding pixel in the geometry and attribute frames at the coordinate (u, v) for reconstruction purposes. An invalid pixel can include information such as padding that can increase the encoding efficiency but does not provide any information associated with the point cloud itself. Generally, the occupancy map is binary, such that the value of each pixel is either one or zero. For example, when the value of a pixel at position (u, v) of the occupancy map is one, indicates that a pixel at (u, v) of an attribute frame and the geometry frame is valid. In contrast, when the value of a pixel at position (u, v) of the occupancy map is zero indicates that a pixel at (u, v) of the attribute frame and the geometry frame is invalid, and therefore does not represent a point of the 3D point cloud. A non-binary occupancy map may be thresholded or processed to generate a binary occupancy map.

The encoder also generates atlas frames 532 that include information relating the pixels of the video frames to the point cloud. For example, the atlas frames 532 can indicate a 3D location of a patch that is stored in the video frames. The atlas frames 532 can also indicate where the patches are located on a 2D grid of a video frame. The atlas frames can also indicate the size of a patch (such as the number of pixels that correspond to a patch).

The encoder 510 transmits frames representing the point cloud as an encoded bitstream 540. The bitstream 540 can be transmitted to an information repository (such as a database) or an electronic device that includes a decoder (such as the decoder 550), or the decoder 550 itself through the network 502.

As illustrated in FIG. 5B, the encoder 510 receives a 3D point cloud 512 and generates a bitstream 540. The bitstream 540 includes data representing a 3D point cloud 512. The bitstream 540 can include multiple bitstreams that are multiplexed together via a multiplexer 538. The bitstream 540 can be transmitted via the network 502 of FIG. 5A to another device, such as the decoder 550, an electronic device that includes the decoder 550, or an information repository. The encoder 510 also includes a patch generator and packer 514, one or more encoding engines (such as encoding engine 522a, 522b, 522c, and 522d which are collectively referred to as encoding engines 522), and an attribute generator 528.

The 3D point cloud 512 can be stored in memory (not shown) or received from another electronic device (not shown). The 3D point cloud 512 can be a single 3D object (similar to the 3D point cloud 400 of FIG. 4A), or a grouping of 3D objects. The 3D point cloud 512 can be a stationary object or an object which moves.

The patch generator and packer 514 is used for generating geometry frames 516, occupancy map frames 518, attribute information (which is used by the attribute generator 528 to generate the attribute frames 520), and atlas frames 532 (which includes patch information providing information about the patches, such as an index number that is associated with each patch).

The patch generator and packer 514 generates patches by taking projections of the 3D point cloud 512 and packs the patches into frames. In certain embodiments, the patch generator and packer 514 splits the geometry information and attribute information of each point of the 3D point cloud 512. The patch generator and packer 514 can use two or more projection planes (such as two or more the projection plans 410-420 of FIG. 4B), to cluster the points of the 3D point cloud 512 to generate the patches. The geometry patches are eventually packed into the geometry frames 516.

The patch generator and packer 514 determines the best projection plane for each point of the 3D point cloud 512. When projected, each cluster of points of the 3D point cloud 512 appears as patch (also referred to as a regular patch). A single cluster of points can be represented by multiple patches (located on different frames), where each patch represents a particular aspect of each point within the cluster of points. For example, a patch representing the geometry locations of the cluster of points is located on the geometry frame 516, and patch representing an attribute of the cluster of points is located on the attribute frame 520.

After determining the best projection plane for each point of the 3D point cloud 512 the patch generator and packer 514 segments the points into patch data structures that are packed frames, such as the geometry frames 516 and the geometry frame 430 of FIG. 4C. As illustrated in FIGS. 4C and 4D, discussed above, the patches are organized and placed within corresponding frames, such as the patch 432 is included in the geometry frame 430 and the patch 442 is included in the attribute frame 440. It is noted that patches representing different attributes of the same cluster of points include a correspondence or a mapping, such a pixel in one patch corresponds to the same pixel in another patch, based on the locations of the pixels being at the same position in the respective frames.

The occupancy map frames 518 represent occupancy maps that indicate the valid pixels in the frames (such as the geometry frames 516). For example, the occupancy map frames 518 indicate whether each pixel in the geometry frame 516 is a valid pixel or an invalid pixel. Each valid pixel in the occupancy map frames 518 corresponds to pixels in the geometry frames 516 that represents a position point of the 3D point cloud 512 in 3D space. In contrast, the invalid pixels are pixels within the occupancy map frames 518 that correspond to pixels in the geometry frames 516 that do not represent a point of the 3D point cloud 512 (such as the empty/black space in the frames 430 and 440 of FIGS. 4C and 4D). In certain embodiments, one of the occupancy map frames 518 can correspond to both a geometry frame 516 and an attribute frame 520 (discussed below).

For example, when the patch generator and packer 514 generates the occupancy map frames 518, the occupancy map frames 518 include predefined values for each pixel, such as zero or one. For example, when a pixel of the occupancy map at position (u, v) is a value of zero, indicates that the pixel at (u, v) in the geometry frame 516 is invalid. Similarly, when a pixel of the occupancy map at position (u, v) is a value of one, indicates that the pixel at (u, v) in the geometry frame 516 is valid and thereby includes information representing a point of the 3D point cloud.

The geometry frames 516 include pixels representing the geometry values of the 3D point cloud 512. The geometry frames 516 include the geographic information of points of the 3D point cloud 512. For example, the two transverse coordinates (with respect to the projection plane) of a 3D point corresponds to the column and row indices in the geometry video frame (u, v) plus a transverse-offset which indicates the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or ZX coordinates.

In certain embodiments, the atlas frames 532 contain information about the patches. For example, the atlas frames 532 include positioning of the patches in the 2D frame, the offsets for the patch segment in the 3D point cloud space, the plane on which the patch is projected on, and the like. The atlas frames 532 can include information that relates the patches that are stored in the geometry frames 516 and occupancy map frames 518 to location on the 3D point cloud 512. The atlas frames can also indicate the size of a patch (such as the number of pixels that correspond to a patch).

Figure 6:
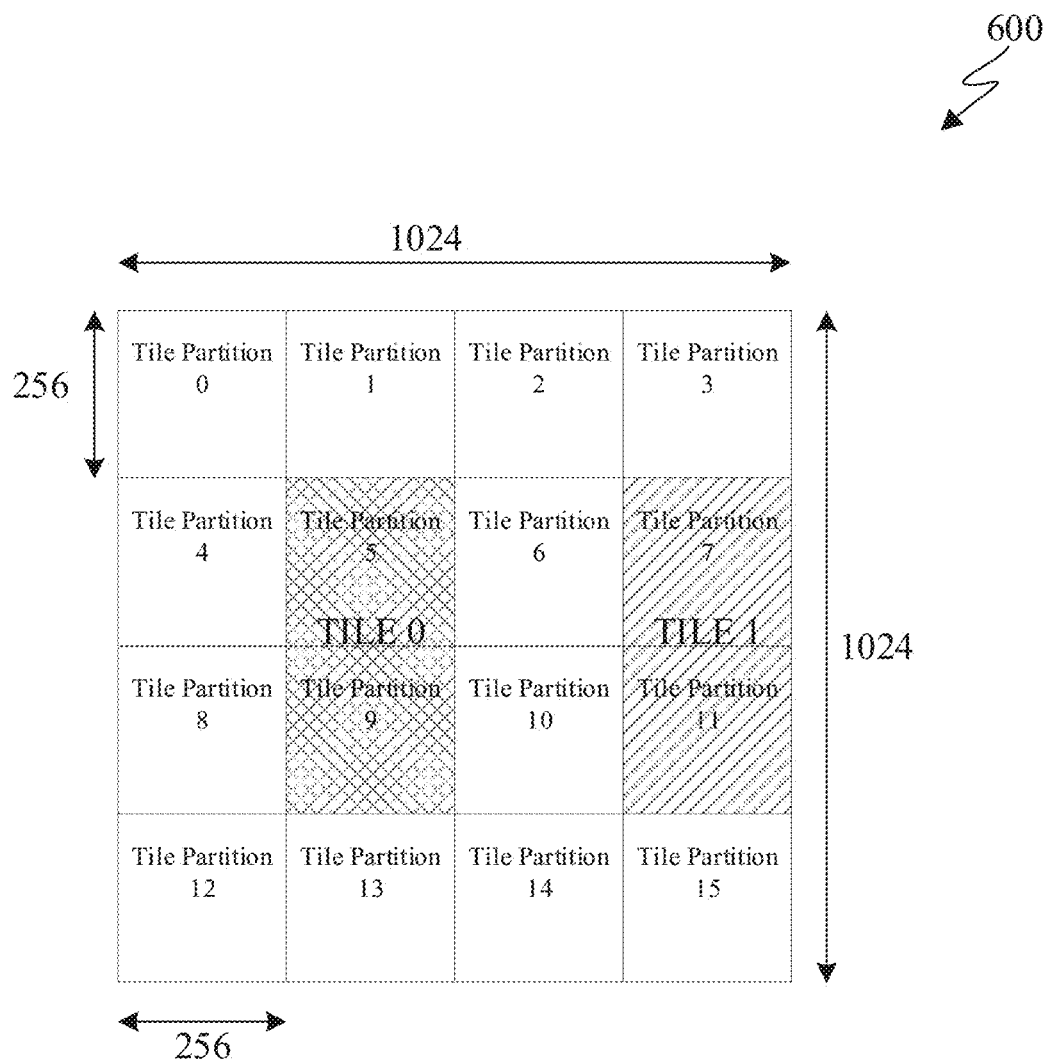
FIG. 6 illustrates an example tile structure of a frame in accordance with an embodiment of this disclosure.

The encoder 510 can also divide the video frames (such as the geometry frames 516, the occupancy map frames 518, and the attribute frames 520) and the atlas frames into tile-partitions. One or more tile partitions can be combined into a tile. The tile-partitions as well as tiles may vary in size. Tiles are non-overlapping independent coding units. Tiles may also be referred to by other names such as slices, partitions, sub-pictures, and the like. FIG. 6, below, illustrate a frame that includes tiles and tile partitions.

Furthermore, in certain embodiments, each tile (or group of tiles) of the video frames (such as the geometry frames 516, the occupancy map frames 518, and the attribute frames 520) and the atlas frames 532 may be encoded (by the encoding engines 522) and decoded independently (by the decoding engines 554 of FIG. 5C) without referring to data from other tiles (or group of tiles) on that frame. For example, if the decoder 550 is only interested in a specific object or portion of a point cloud (or area of infests), the decoder can decode only the tiles that are associated with that object (or area of interest).

It is noted that if the atlas frame 532 is partitioned into tiles but the video frames (such as the geometry frames 516, the occupancy map frames 518, and the attribute frames 520) are not (such that the frame itself is a single tile), then only the atlas frame can be partially decoded by the decoder 550, which provides limited savings. Therefore, if the video frames (such as the geometry frames 516, the occupancy map frames 518, and the attribute frames 520) also use tiles, then a decoder (such as the decoder 550 of FIGS. 5A and 5C) can decode only the video tiles and the atlas tiles that are associated with the object of interest. Accordingly, embodiments of the present disclosure provide systems and methods to relate tile sizes of different frames with respect to each other.

The encoder 510 includes one or more encoding engines 522. In certain embodiments, the video frames (such as the geometry frames 516, the occupancy map frames 518, and the attribute frames 520) and the atlas frames 532 are encoded by independent encoding engines 522, as illustrated. In other embodiments, a single encoding engine performs the encoding of the frames.

The encoding engines 522 can be configured to support an 8-bit, a 10-bit, a 12-bit, a 14-bit, or a 16-bit, precision of data. The encoding engines 522 can include a video or image codec such as HEVC, AVC, VP9, VP8, VVC, EVC, AV1 and the like to compress the 2D frames representing the 3D point cloud. The one or more of the encoding engines 522 can compress the information in a lossy or lossless manner.

As illustrated, the encoding engine 522a receives geometry frames 516 and performs geometry compression to generate a geometry sub-bitstream 524a. The encoding engine 522b receives occupancy map frames 518 and performs occupancy map compression to generate an occupancy map sub-bitstream 526a. The encoding engine 522c receives attribute frames 520 and performs attribute compression to generate an attribute sub-bitstream 530. The encoding engine 522d receives atlas frames 532 and performs compression to generate an atlas sub-bitstream 534a. In certain embodiments, the atlas is not compressed.

In certain embodiments, the encoding engines 522 can subsample the video frames (such as the geometry frames 516, the occupancy map frames 518, and the attribute frames 520) and the atlas frames 532 differently. For example, the atlas frames 532 can be sized 1024×1024, the geometry frames 516 can be sized 512×512, the occupancy map frames 518 can be sized 256×256, and the attribute frames 520 can be sized 128×128. The sizes in this example are for explanation only and other sizes for the frames can be used. Additionally, some of the frames can be subsampled to the same size.

After the encoding engine 522a generates the geometry sub-bitstream 524a, a decoding engine (not shown) can decode the geometry sub-bitstream 524a to generate the reconstructed geometry frames 524b. Similarly, after the encoding engine 522b generates the occupancy map sub-bitstream 526a, a decoding engine (not shown) can decode the occupancy map sub-bitstream 526a to generate the reconstructed occupancy map frames 526b.

The attribute generator 528 generates the attribute frames 520 based on the attribute information from the 3D point cloud 512 provided by the patch generator and packer 514, the reconstructed geometry frames 524b, the reconstructed occupancy map frames 526b.

In certain embodiments, to generate one of the attribute frames 520 that represent color, the geometry frames 516 are compressed by the encoding engine 522a using a 2D video codec such as HEVC. The geometry sub-bitstream 524a is decoded to generate the reconstructed geometry frames 524b. Similarly, the occupancy map frame 518 is compressed using the encoding engine 522b and then decompressed to generate the reconstructed occupancy map frames 526b. The encoder 510 can then reconstruct the geometric locations of the points of the 3D point cloud based on the reconstructed geometry frames 524b and the reconstructed occupancy map frames 526b. The attribute generator 528 interpolates the attribute values (such as color) of each point from the color values of input point cloud to the reconstructed point cloud and the original point cloud 512. The interpolated colors are then segmented, by the attribute generator 528, to match the same patches as the geometry information. The attribute generator 528 then packs interpolated attribute values into an attribute frame 520 representing color. In other embodiments, the attribute generator can perform other methods for generating the attribute frames.

In certain embodiments, the attribute generator 528 uses the atlas frames 532 when generating the attribute frames 520. For example, if the atlas indicates the locations and sizes of tiles in the geometry frames 516 and occupancy map frames 518, then the attribute generator 528 uses the tile information within the atlas frames 532 when generating the attribute frames 520.

The attribute frames 520 represents one or more different attributes of the point cloud. For example, for one of the geometry frames 516 there can be zero or more corresponding attribute frames 520. The attribute frame can represent attributes such as color, texture, normal, material properties, reflection, motion, and the like. In certain embodiments, one of the attribute frames 520 can include color values for each of the geometry points within one of the geometry frames 516, while another attribute frame can include reflectance values which indicate the level of reflectance of each corresponding geometry point within the same geometry frame 516. Each additional attribute frame 520 represents other attributes associated with a particular geometry frame 516. In certain embodiments, each geometry frame 516 has at least one corresponding attribute frame 520.

In certain embodiments, there is a nominal height and width associated with the video frames (such as the geometry frames 516, the occupancy map frames 518, and the attribute frames 520) and the atlas frames 532. For example, the nominal height the bitstream 540 can be denoted as vps_frame_height[k] and vps_frame_width[k], where k refers to the atlas index.

Similarly, the height and width of the atlas frames 532 can denoted as asps_frame_height and asps_frame_width, respectively. In certain embodiments, the asps_frame_height is equal to vps_frame_height and asps_frame_width is equal to vps_frame_width. It is noted that occupancy, geometry and attribute components can have different resolutions and frame rates.

In certain embodiments, the video frames (such as the geometry frames 516, the occupancy map frames 518, and the attribute frames 520) and the atlas frames 532 can be the same size. In other embodiments, any of video frames (such as the geometry frames 516, the occupancy map frames 518, and the attribute frames 520) and the atlas frames 532 can be different sizes. For example, any one of the video frames (such as the geometry frames 516, the occupancy map frames 518, and the attribute frames 520) can be subsampled in the horizontal direction, the vertical direction, or both. If any of the video frames are subsampled, the value of the syntax element (that describes the relationships between sizes of the video tiles and sizes of the atlas tiles), included in the parameter sets and messages 536a, provides an indication to the decoder 550 as to whether the video frames and the atlas frames use tiling, and the size relationships between the tiles of the atlas frames and tiles of the video frames when converted to the atlas frame resolution. This is also referred to as the nominal size.

The parameter sets and messages 536a can include messages, syntax elements, and the like. In certain embodiments, parameter sets and messages 536a include information, such as supplemental enhancement information (SEI) messages, information including one or more flags, one or more additional syntax elements, one or more quantization parameter size, one or more thresholds, geometry smoothing parameters, attribute smoothing parameters, or any combination thereof. The smoothing parameters can be utilized by the decoder 550 for improving the visual quality of the reconstructed point cloud.

In certain embodiments, the tiling structure of the atlas frames 532 and the video frames (such as the geometry frames 516, the occupancy map frames 518 and the attribute frames 520) remain constant throughout a coded V-PCC sequence and indicated in the parameter sets and messages 536a. For the atlas frames 532, this condition can be signaled in a video usability information (VUI) and indicated in the parameter sets and messages 536a. For example, to indicate that the tiling structure of the atlas frames 532 is constant a syntax element vui_fixed_atlas_tile_structure_flag can be set to a predefined value, such as 1. Similarly, for the video bitstream(s), this condition is signaled in the VUI by setting the value of the syntax element vui_fixed_video_tile_structure_flag can be set to a predefined value, such as 1 and indicated in the parameter sets and messages 536a.

Certain SEI message describe the relationships between the objects of the point cloud in 3D space to the individual patches on a 2D frame. Certain SEI messages can be used to describe 3D objects and how they relate to tiles and patches. For example, SEI messages can describe 3D objects in the point cloud space, their correspondence to the patches and rectangles (or regions) on the 2D atlas frames 532 that encompass the patches corresponding to the 3D objects. These SEI messages can be collectively referred to as volumetric annotation SEI messages.

In certain embodiments, (i) a scene object information SEI message, (ii) an object label information SEI message, (iii) a volumetric rectangle information SEI message can be used for partial decoding. Additionally, a patch information SEI message can be used for partial reconstruction of the point cloud. These SEI messages can be used by a decoder to decode an area (or objects) of interest of a point cloud and reconstruct that area (or object) of interest without having to decode and reconstruct the entire bitstream.

Figure 7A:
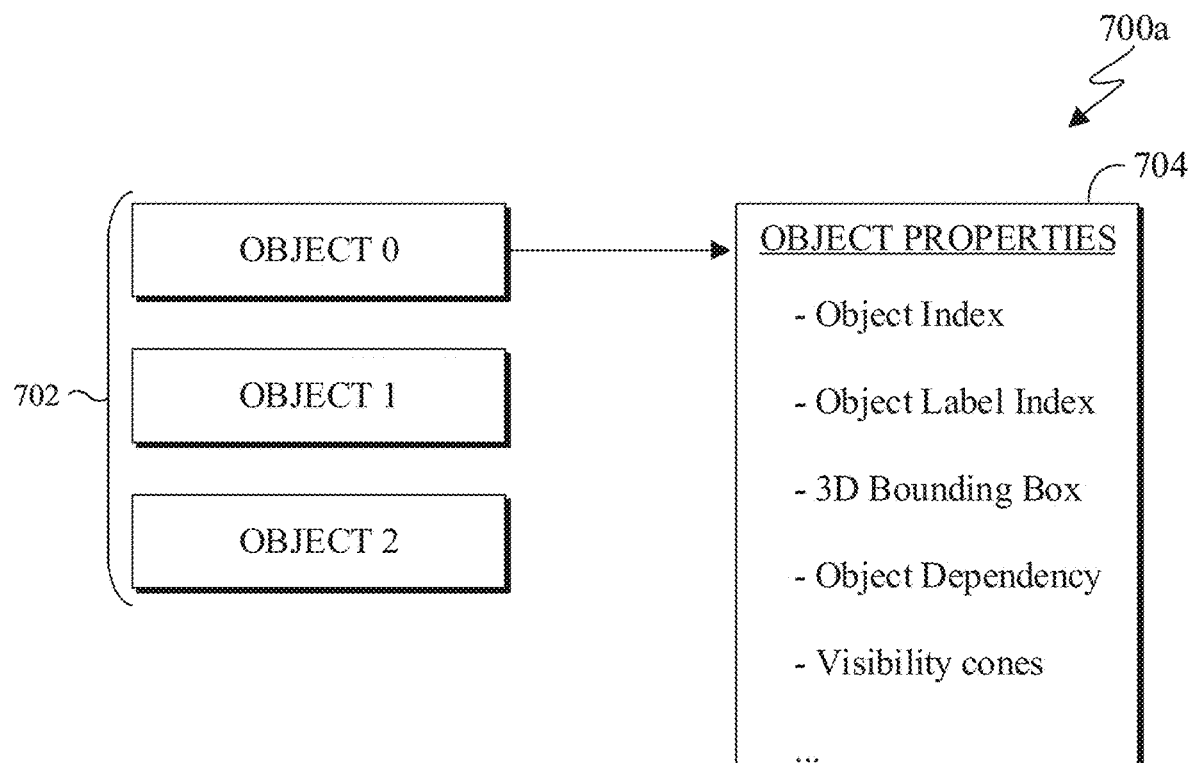
FIGS. 7A, 7B, and 7C illustrate example diagrams representing messages in accordance with an embodiment of this disclosure.

The scene object information SEI message defines a set of 3D objects that may be present in a volumetric scene, and assigns different properties to these objects, such as labels, visibility information, and the like. At the start of a V-PCC sequence, a list of 3D scene objects is initialized to empty. Before decoding each point cloud frame, the list of objects is updated according to a scene object information SEI message corresponding to that frame or if absent, according to the persistence rules defined in the V-PCC specification. FIG. 7A illustrates an example of a list of 3D objects maintained by the scene object information SEI message with 3D scene objects.

The object label information SEI message defines a set of labels that may be associated with 3D scene objects in a volumetric scene, defined in the scene object information SEI message. At the start of the sequence, a list of labels is initialized to empty. Before decoding each point cloud frame, the list of labels is updated according to an object label SEI message corresponding to that frame or if absent, according to the persistence rules defined in the V-PCC specification.

Figure 7B:
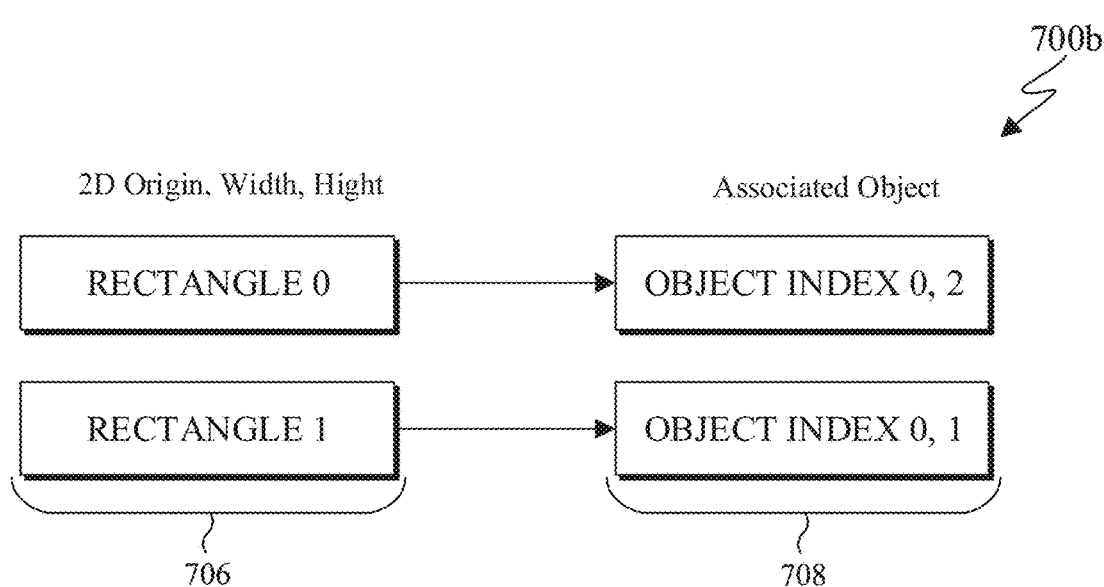

The volumetric rectangle information SEI message defines a set of volumetric rectangles (or regions) within an atlas. Each rectangle (or regions) may be associated with one or more 3D scene objects defined by the scene object information SEI message. At the start of the sequence, a list of rectangles is initialized to empty. Before decoding each point cloud frame, the list of rectangles is updated according to a volumetric rectangle information SEI message corresponding to that frame or if absent, according to the persistence rules defined in the V-PCC specification. FIG. 7B illustrates an example of a list of volumetric rectangles maintained by the volumetric rectangle information SEI message.

Figure 7C:
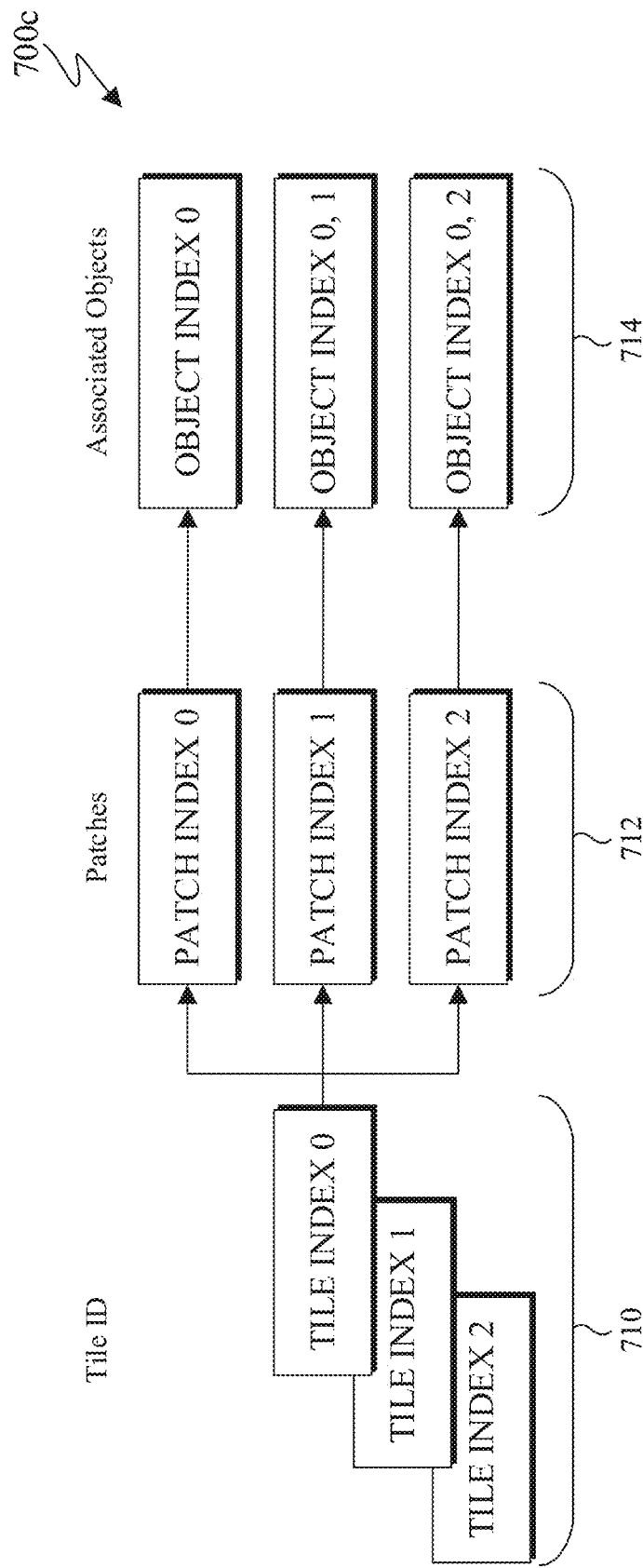

The patch information SEI message defines a list of tiles and corresponding patches that may be present in the current frame. These patches can be associated with one or more 3D scene objects defined through scene object information SEI messages. At the start of the sequence, a list of tiles and corresponding patches is initialized to empty. Before decoding each point cloud frame, the list of tiles and corresponding patches is updated according to a patch information SEI message corresponding to that frame or if absent, according to the persistence rules defined in the V-PCC specification. FIG. 7C illustrates an example of a list of tiles, corresponding patches, and 3D scene objects associated with each patch maintained by the patch information SEI message.

The multiplexer 538 combines the atlas sub-bitstream 534a, the geometry sub-bitstream 524a, the occupancy map sub-bitstream 526a, the attribute sub-bitstream 530 and the parameter sets and messages 536a, to create the bitstream 540.

Generally, the decoder 550 of FIGS. 5A and 5C, receives a bitstream (such as the bitstream 540) that represents media content, such as a point cloud. The bitstream 540 can include data representing a 3D point cloud. In certain embodiments, the decoder 550 can decode the bitstream 540 and generate multiple frames such as one or more geometry frames, one or more attribute frames, and one or more occupancy map frames. In other embodiments, the decoder 550 can decode portions of the bitstream 540 and generate portions of the multiple frames. The decoder 550 reconstructs the point cloud or a portion of the point cloud using the multiple frames, which can be rendered and viewed by a user. The decoder 550 can perform the partial decoding and the partial reconstruction based on relationships between sizes of the video tile and sizes of the atlas tile as indicated by parameter sets and messages 536a.

As illustrated in FIG. 5C, the decoder 550 includes a demultiplexer 552, one or more decoding engines (such as a decoding engine 554a, a decoding engine 554b, a decoding engine 554c, and a decoding engine 554d), a geometry and attribute reconstruction engine 556, smoothing engines (such as a geometry smoothing engine 558a and an attribute smoothing 558b), and an attribute transfer engine 560.

The decoder 550 receives a bitstream 540, such as the bitstream that was generated by the encoder 510. The demultiplexer 552 separates bitstream 540 into one or more sub-bitstreams representing the different information. For example, the demultiplexer 552 separates various streams of data such into the individual sub-bitstreams such as the parameters sets and messages 536b, the geometry sub-bitstream 524a, the occupancy map sub-bitstream 526a, the attribute sub-bitstream 530, and the atlas sub-bitstream 534a. The parameters sets and messages 536b can include one or more SEI messages (such as the volumetric annotation SEI messages), syntax elements, geometry smoothing parameters, attribute smoothing parameters, and the like. In certain embodiments, the geometry smoothing parameters and the attribute smoothing parameters are not included in the bitstream if the encoder 510 did not perform smoothing.

The decoder 550 includes one or more decoding engines. For example, the decoder 550 can include the decoding engine 554a, a decoding engine 554b, a decoding engine 554c, and a decoding engine 554d (collectively referred to as the decoding engines 554). In certain embodiments, a single decoding engine performs the operations of all of the individual decoding engines 554.

In order to render the 3D point cloud, the decoder 550 needs to decode the atlas sub-bitstream 534a and the video sub bitstreams (such as the geometry sub-bitstream 524a, the occupancy map sub-bitstream 526a, the attribute sub-bitstream 530). Decoding all of these bitstreams can be computationally challenging for certain devices. Additionally, if the device is battery powered, can consume a considerable amount of battery power for decoding the entirety of all of these bitstreams. Accordingly, to reduce the computational challenges and conserve battery, embodiments of the present disclosure describe methods for partially decoding the various sub-bitstreams. Embodiments of the present disclosure also describe partially reconstructing the point cloud, regardless of whether the various sub-bitstreams were partially or fully decoded to reduce the computational complexity and conserve battery.

In certain embodiments, the parameter sets and messages 536b provides one or more syntax elements and one or more SEI messages to each of the decoding engines 554. The decoder 550 can use the one or more syntax elements and one or more SEI messages for determining whether to fully decode each bitstream or partially decode one or more of the bitstreams. Additionally, the decoder 550 can use the one or more syntax elements and one or more SEI messages to determine portions of the bitstreams to decode. For example, each of the decoding engines 554 determines relationships between the various 3D objects and how the objects relate to the tiles and patches of a frame. Based on the relationship, the decoder 550 can use the decoding engines 554 to identify portions of the video sub-bitstreams and the atlas sub-bitstream to decode. For example, for a given area of an atlas frame of the atlas frames, the decoder 550 can identify tiles of a frame (such as a geometry frame of the geometry sub-bitstream 524a), to decode.

The scene object information SEI messages (described above and in FIG. 7A), the object label information SEI messages (described above), and the volumetric rectangle information SEI messages (described above and in FIG. 7B) may be used to determine which video and atlas tiles need to be decoded to access a particular object of the 3D point cloud. The patch information SEI message (described above and in FIG. 7C) enables partial reconstruction of the point cloud by reconstructing points from only those patches that overlap with specific 3D objects defined by the scene object information SEI message.

The decoding engine 554a decodes the geometry sub-bitstream 524a into reconstructed geometry 516a. Similarly, the decoding engine 554b decodes the occupancy map sub-bitstream 526*a* into reconstructed occupancy map frames 518*a*. Additionally, the decoding engine 554*c* decodes the attribute sub-bitstream 530 into reconstructed attribute 520*a*. The decoding engine 554*d* decodes the atlas sub-bitstream 534*a* into reconstructed atlas frames 532*a*. In certain embodiments, if the atlas frames 532 of FIG. 5B was not encoded, then demultiplexer 552 separates the atlas frames 532 from the bitstream (instead of the atlas sub-bitstream 534*a*) and the atlas frames 532 are not decoded by the decoding engine 554*d*.

To partially decode any of the sub-bitstreams, the decoder 550 identifies a particular object (portion) of the 3D point cloud to decode. For example, the decoder can obtain a user defined object label that specifies a specific part (or parts) of the point cloud (such as the face of a person in the point cloud), and search for that specific object label via the volumetric annotation SEI messages. For another example, an application associated with the decoder 550 may decide the specific label to search for, based on certain criteria such as the compute resources available, battery level, the application type and the like. For instance, in a telepresence system, if the compute resources are limited or the battery level is low, the decoder 550 can determine to search for 3D objects with the label "head" without explicit input from the user. Similarly, if the application type is a video game, the application may specify specific labels that include objects within a threshold distance from the point of view of the user without explicit input from the user. The label is referred to as the "query label." The query label may change from one point cloud frame to the next, but in this invention we will assume that it stays the same for a V-PCC sequence.

In certain embodiments, at the start of the point cloud sequence, the lists maintained by scene object information SEI (described below in FIG. 7A), object label information SEI, and volumetric rectangle SEI (described below in FIG. 7B) are initialized. Then, for each point cloud frame, the lists corresponding to the SEI messages are updated according to the SEI message associated with that frame or if absent, according to another predefined rule such as the rules defined in the V-PCC specification. Then, the list of current object labels maintained by the object label information SEI message is searched to find a match with the query label. The match may be defined as a partial match or a full match. For example, if the query label is "head" and the object label is "head and shoulders", it may be considered as a partial match. If the query label is "head" and the object label is "head", it may be considered as a full match. If a match is not found, the next point cloud frame is processed. If a match is found, the 3D scene objects which have the same label as the query label are identified. If there is no match, the decoder 550 may decide not to decode any of the component tiles for that point cloud frame.

There can be one or more single 3D scene object whose label matches the query label. The following description describes a single 3D scene object whose label matches the query label. It is noted that the process repeats for each subsequent 3D scene object whose label matches the query label. After determining that a single 3D scene object whose label matches the query label, the decoder 550 searches the volumetric rectangle (or region) list, via the volumetric rectangle information SEI message (described in FIG. 7B), to identify volumetric rectangles that correspond to the identified 3D scene object.

Again, one or more such volumetric rectangles can be identified. The following description describes a single volumetric rectangle. After identifying one such volumetric rectangle, for the current point cloud frame, for each V-PCC component (such as the geometry sub-bitstream 524*a*, the occupancy map sub-bitstream 526*a*, attribute sub-bitstream 530, and the atlas sub-bitstream 534*a*), the decoder 550 identifies tiles that overlap with the volumetric rectangle. Tiles that overlap with the volumetric rectangle are marked as "need to decode." The tiles that are not tagged as "need to decode" are tagged as "no decoding needed." That is, the tiles that do not overlap the volumetric rectangle are tagged as "no decoding needed." This process is continued until all the point cloud frames are processed in this manner.

In certain embodiment, some of the V-PCC component (such as the geometry sub-bitstream 524*a*, the occupancy map sub-bitstream 526*a*, attribute sub-bitstream 530, and the atlas sub-bitstream 534*a*) are at different (lower) resolution. When the various sub-bitstreams are at different resolutions, then the tile size and position at nominal resolution is considered for determining the overlap with the volumetric rectangle. For example, if the nominal width and height of the atlas frame is 1024×1024 (such as the frame 600 of FIG. 6) and the geometry component is of size 512×512. Then, for a geometry tile starting at position (128, 128) of size 128×128, the equivalent position and size at the nominal resolution would be a tile starting at position (256, 256) of size 256×256.

It is noted that the process of tagging the tiles as described above is not adequate to determine which tiles should be decoded due to the temporal prediction used by video coders. In order to decode a specific tile in the current frame, the same tile from other frames preceding the current frame (in decoding order) may have to be decoded as well.

The decoder 550 identifies tiles from preceding frames in order to decode the identified tile(s). The decoder 550 identifies, for each frame of each V-PCC component (such as the geometry sub-bitstream 524*a*, the occupancy map sub-bitstream 526*a*, attribute sub-bitstream 530, and the atlas sub-bitstream 534*a*), the nearest random access point frame (such as an intra random access point (IRAP) frame in HEVC) that precedes the current frame in decoding order as well as output order.

Figure 8A:
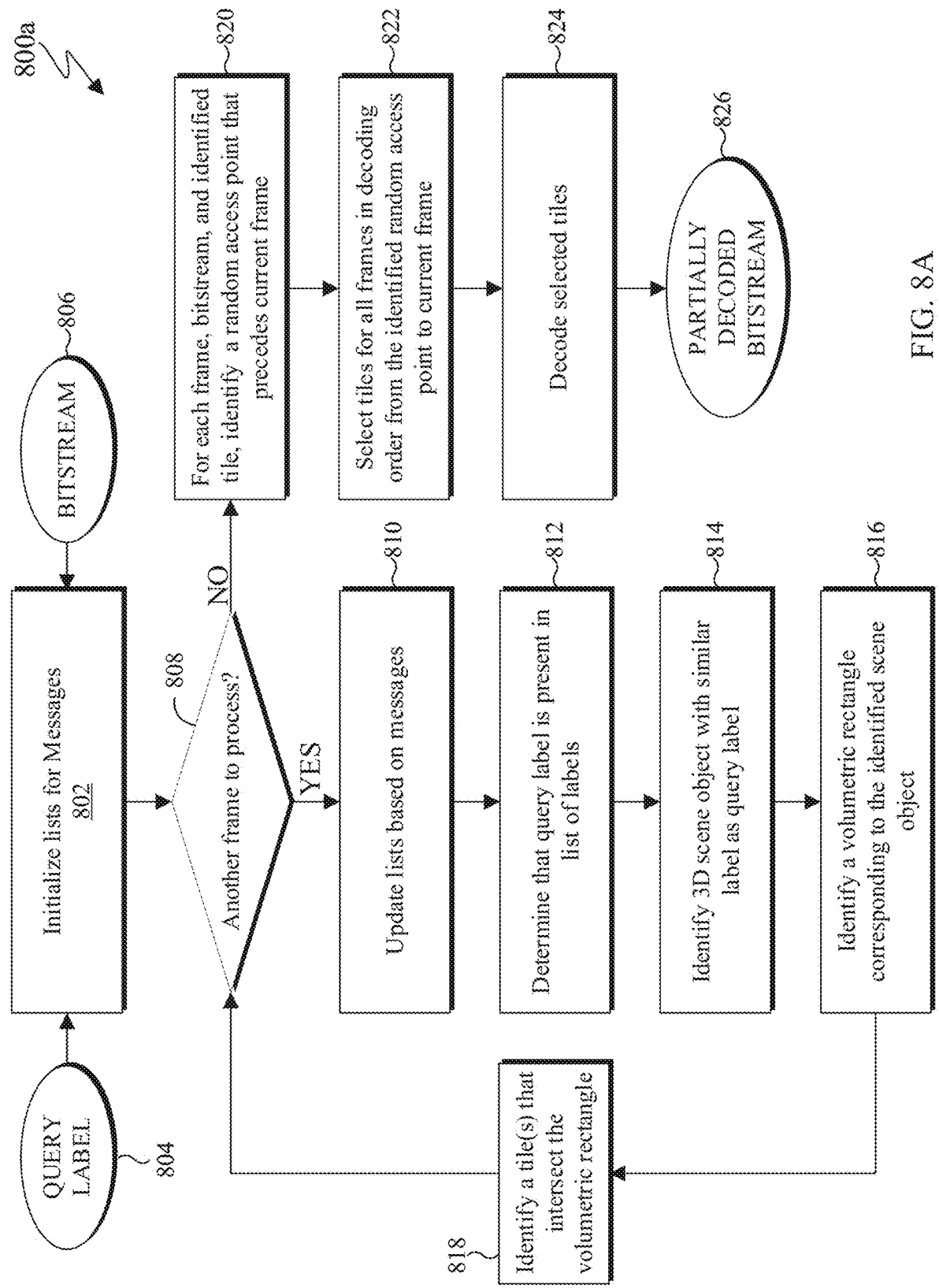
FIGS. 8A and 8B illustrate example methods for partial decoding of a bitstream corresponding to point cloud in accordance with an embodiment of this disclosure.

For a tile in a current frame that is tagged as "need to decode", a corresponding tile for all the frames in the decoding order from the identified random access point frame to the current frame is also tagged as "need to decode." For each V-PCC component, the decoding is started from a random access point frame for each tile tagged as "need to decode" and is discontinued when the tag for the tile changes to "no decoding needed." FIG. 8A, describes the process of the decoder 550 decoding certain tiles of the point cloud.

When multiple 3D scene objects match the query label, the above process may be repeated for each 3D object. Similarly, if there are multiple volumetric rectangles that correspond to one or more identified 3D scene objects, a tile is tagged as "need to decode" if it intersects with any of the corresponding volumetric rectangles.

Even though in this embodiment, the decoding process is started after processing the SEI messages for all the frames in the sequence, in another embodiment, the decoding process may be started after SEI messages for a few frames have been processed. This may depend on the prediction structures (such as random access (RA) or low delay (LD)) and random access points of the individual V-PCC components (such as the geometry sub-bitstream 524*a*, the occupancy map sub-bitstream 526*a*, attribute sub-bitstream 530, and the atlas sub-bitstream 534*a*).

After a portion of the reconstructed geometry 516*a*, and a portion of the reconstructed occupancy map frames 518*a*, a portion of the reconstructed attribute 520*a*, and a portion of the reconstructed atlas frames 532*a*, are decoded, the geometry and attribute reconstruction engine 556 generates a reconstructed point cloud. As discussed above, the portion of the decoded frames can be the entirety of the frames or less. In certain embodiments, the parameter sets and messages 536*b* can provide various flags, syntax elements, messages, and the like to the geometry and attribute reconstruction engine 556 for reconstructs the points of the point cloud in 3D space. The geometry and attribute reconstruction engine 556 reconstructs the points of the point cloud in 3D space, based on the reconstructed occupancy map frames 518*a*, the reconstructed geometry 516*a*, the reconstructed attribute 520*a*, the reconstructed atlas frames 532*a* and any received information from the parameter sets and messages 536*b*.

Figure 8B:
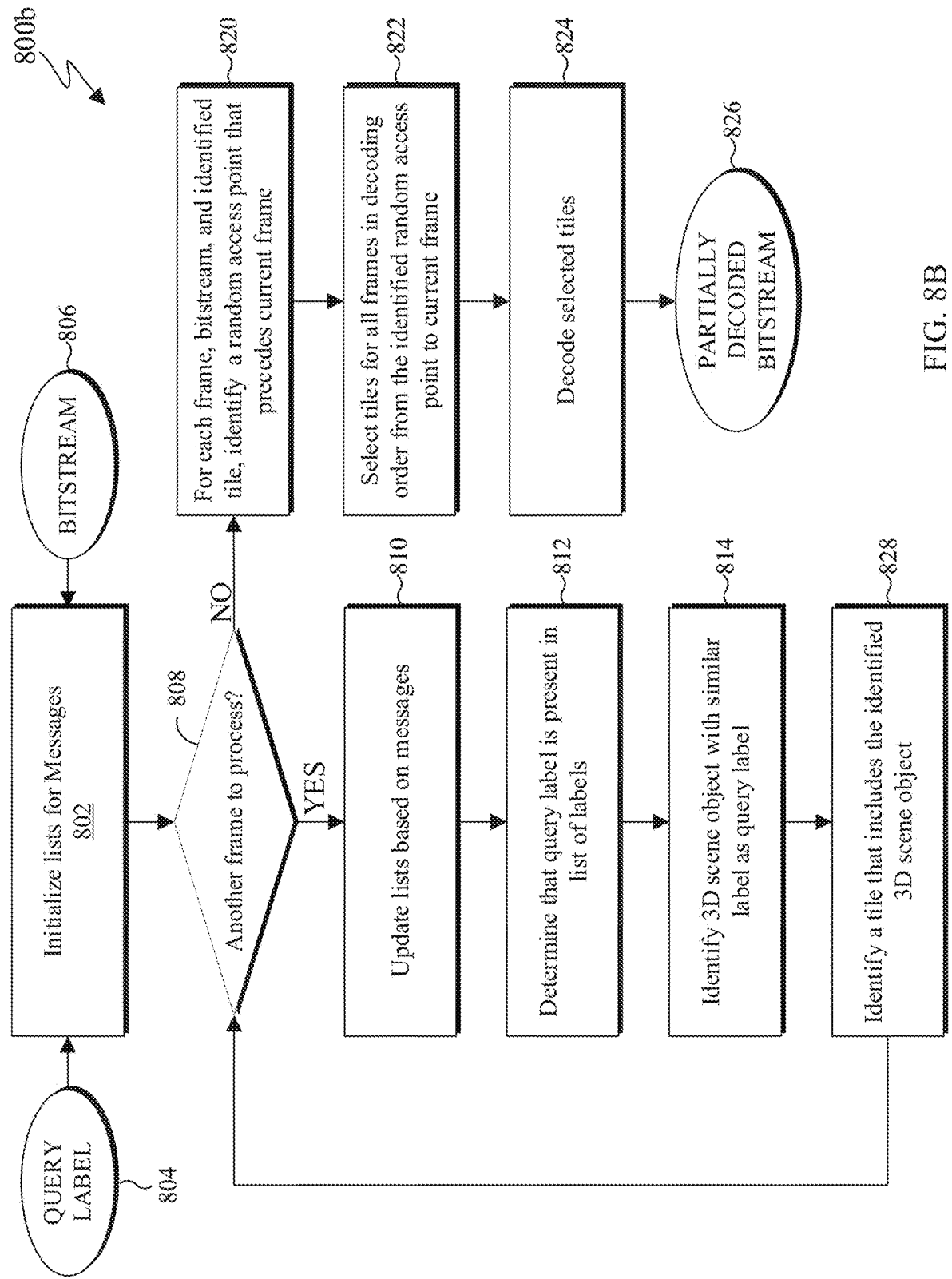

In certain embodiments, the decoder 550 performs partial reconstruction as described in FIG. 8B. First, the list of tiles and patches maintained by the patch information SEI message (described in FIG. 7C) are initialized. Then, for each point cloud frame, the list is updated according to the SEI message corresponding to that frame or if absent, according to another predefined rule such as the rules defined in the V-PCC specification. Then, for each 3D scene object identified as having a label matching with the query label, the patches that correspond to the 3D scene object, according to the list maintained by the patch information SEI message, are identified and tagged as "need to reconstruct." The patches that are not tagged as "need to reconstruct" are tagged as "no reconstruction." The decoder 550, using this information and the partially decoded V-PCC bitstream, for each frame only points corresponding to the patches tagged as "need to reconstruct" are reconstructed and assigned attribute values (if present).

If auxiliary videos corresponding to geometry and/or attribute components are present, all the tiles of the auxiliary videos are decoded in one embodiment. This is because the volumetric rectangles correspond to the 2D atlas frames, not the auxiliary video frames. However, each patch belongs to a separate tile in an auxiliary video. Thus, for each patch in auxiliary video, it may be possible to derive the 3D bounding box using patch information. If a 3D scene object has a 3D bounding box associated with it and the 3D bounding boxes for the 3D scene object and auxiliary patch do not overlap, the decoding of the auxiliary tile to which the patch belongs can be skipped.

The geometry smoothing engine 558*a* can be enabled or disabled. If the geometry smoothing engine 558*a* is enabled, then the geometry smoothing engine 558*a* performs smoothing to the geometry points of the reconstructed point cloud. The geometry smoothing engine 558*a* can use a geometry smoothing parameter provided by the parameter sets and messages 536*b*. If the geometry smoothing engine 558*a* is disabled, then the decoder 550 does not perform geometry smoothing.

In certain embodiments, the decoder 550, via the attribute transfer engine 560, performs attribute transfer step. The attribute transfer engine 560 modifies the attribute information to match the locations of the points in 3D space.

The attribute smoothing engine 558*b* can be enabled or disabled. If the attribute smoothing engine 558*b* is enabled, then the attribute smoothing engine 558*b* performs smoothing to the attribute points of the reconstructed point cloud. The attribute smoothing engine 558*b* can use an attribute smoothing parameter provided by the parameter sets and messages 536*b*. In this case, if attribute smoothing is enabled, the attribute smoothing engine 558*b* smooths the reconstructed attributes based on one or more attribute smoothing parameter. Thereafter the decoder renders the point cloud 562. If attribute smoothing is disabled, then the decoder 550 skips the attribute smoothing engine 558*b* and no attribute smoothing is performed.

Although FIG. 5A illustrate the environment-architecture 500, FIG. 5B illustrates the encoder 510, and FIG. 5C illustrates the decoder 550, various changes can be made to FIGS. 5A, 5B, and 5C. For example, any number of encoders or decoders can be included environment-architecture 500.

FIG. 6 illustrates an example tile structure of a frame 600 in accordance with an embodiment of this disclosure. The example tile structures of the frame 600 is for example only. For example, other tiling structures can be used. The process of creating the tile structure of the frame 600 and identifying the relationships between the objects of the 3D point cloud, and the corresponding tiles can be performed by the server 104, any of the client devices 106-116 of FIG. 1, the server 200 of FIG. 2, the electronic device 300 of FIG. 3, the encoder 510 of FIGS. 5A and 5B, the decoder 550 of FIGS. 5A and 5C, or any other suitable device or system.

The frame 600 is divided into tile-partitions. Additionally, one or more of the tile-partitions (such as tile partition 0 through tile partition 15) may be combined into tiles. As illustrated in the frame 600 of FIG. 6, the tile partitions 5 and 9 are combined to form tile 0. Similarly, the tile partitions 7 and 11 are combined to form tile 1.

In certain embodiments, the tile-partitions as well as tiles may vary in size. Furthermore, each tile (such as tile 0 and tile 1) of the frame 600 may be decoded independently without referring to data from other tiles.

In certain embodiments, a number of SEI messages and signals (such as those included in the parameter sets and messages 536*a*) can be used to define objects, track the objects, specify where the objects are positioned with respect to the 2D frame, and to associate the objects with atlas tiles and patches. Thus, if a decoder (such as the decoder 550) is interested in a specific object, the decoder can decode only the atlas tiles and corresponding video tiles that are associated with that object.

FIG. 6 illustrates the tile structure of a frame 600. The frame 600 is 1024 (H)×1024 (W) in size and divided into 16 non-overlapping tile-partitions of a uniform size, that of 256×256. As illustrated the atlas frame includes two tiles. The first tile, denoted as tile 0, includes the tile-partitions 5 and 9. The second tile, denoted as tile 1, includes the tile-partitions 7 and 11. If tile 0 includes the object of interest, then the decoder (such as the decoding engine 554*d* of FIG. 5C) can decode only tile 0 to access information associated with the object of interest. Similarly, if tile 0 and tile 1 includes the object of interest, then the atlas decoder (such as the decoding engine 554*d* of FIG. 5C) can decode tiles 0 and 1 to access information associated with the object of interest. As described above, if the tiles were encoded using various prediction structures, then the decoder would need to find a random access point that is associated with a tile from a previous frame that does not rely on any other tile, in order to decode the current tile.

Although FIG. 6 illustrates an example tiling structure of the frame 600 various changes can be made to FIG. 6. For example, the frame 600 can be a different size. For another example, any number of tile partitions can be used. For yet another example, the number of tiles and their locations can be different.

FIGS. 7A, 7B, and 7C illustrate example diagrams representing messages in accordance with an embodiment of this disclosure. For example, FIG. 7A illustrates a diagram 700a describing the scene object information SEI message. FIG. 7B illustrates a diagram 700b describing the volumetric rectangle information SEI message. FIG. 7C illustrates a diagram 700c describing the patch information SEI message. The example diagrams of FIGS. 7A, 7B, and 7C illustrating SEI messages are for example only.

The diagram 700a of FIG. 7A describes the scene object information SEI message. The scene object information SEI message of FIG. 7A is used during the decoding process. The scene object information SEI message defines a set of 3D objects 702 that may be included in a volumetric scene. The scene object information SEI message assigns various object properties 704 to each of the objects 702. As illustrated, Object 0 of the objects 702 includes various object properties such as (i) an object index, (ii) an object label index, (iii) a 3D bounding box, (iv) an indication of object dependency, (v) visibility cones, and the like. In certain embodiments, more or less properties could be included in the object property 704 that is associated with each of the objects 702.

The object index that is included in the object properties 704 is an index value that relates the objects which are defined in the volumetric rectangle information SEI message (illustrated in FIG. 7B) and the patch information SEI message (illustrated in FIG. 7C). The object label index that is included in the object properties 704 is an index value that relates the labels which are defined in the patch information SEI message (illustrated in FIG. 7C).

The 3D bounding box that is included in the object properties 704 is describes a cuboid in 3D space. For example, the 3D bounding box can specify an X coordinates between a first value and a second value, a Y coordinates between a third value and a fourth value, and Z coordinates between a fifth value and a sixth value. In certain embodiments, 3D bounding box is omitted from the object properties 704.

The diagram 700b of FIG. 7B describes the volumetric rectangle information SEI message. The volumetric rectangle information SEI message of FIG. 7A is used during the decoding process. The volumetric rectangle information SEI message defines a set of rectangles 706, such as rectangles within a frame. Each region (or rectangle) can be associated one or more 3D scene objects which are defined by an object index identifier 708, corresponding to the scene object information SEI message of FIG. 7A. As illustrated one region, such as rectangle 0 includes two different objects, which are identified by index values 0, and 2. The decoder 550 referring to the can then refer to the scene object information SEI message of FIG. 7A to identify the object itself.

The diagram 700c of FIG. 7C describes the patch information SEI message. The patch information SEI message is used during the reconstruction process. The patch information SEI message defines a list of tiles 710 and corresponding zero or more patches 712 that may be included in a current frame. The patches 712 can be associated with one or more 3D screen objects 714 which are defined in the scene object information SEI message, described in FIG. 7A. For example, tile index 0, of the list of tiles 710, corresponds to a tile in a frame. As illustrated, that tile index 0 includes three patches, which are identified by a patch index number, such as patch index numbers 0, 1, and 2. The patch index number 0 includes the object which is defined by object index 0 of the scene object information SEI message, described in FIG. 7A. Similarly, the patch index number 1 includes the object which is defined by object index 0 and object index 1 of the scene object information SEI message, described in FIG. 7A.

Although FIGS. 7A, 7B, and 7C illustrates an example diagrams describing various SEI messages, various changes can be made to FIGS. 7A, 7B, and 7C. For example, each rectangle of the diagram 700b of FIG. 7B can be related to more or less objects. Similarly, each tile of the diagram 700c of FIG. 7C can be related to more or less patches and each patch which can be related to more or less objects.

Figure 8C:
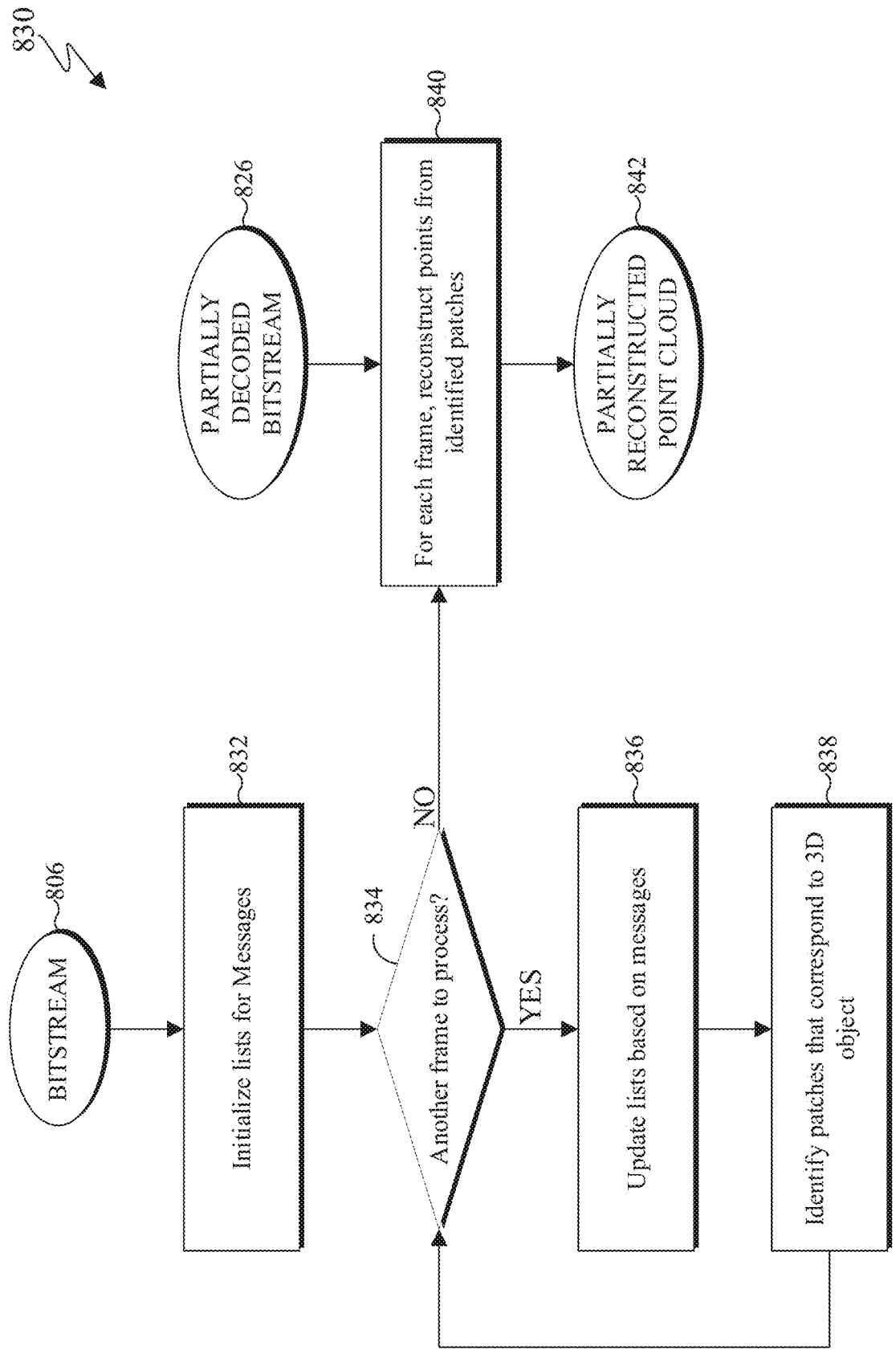
FIG. 8C illustrates an example method for partial reconstruction of a point cloud in accordance with an embodiment of this disclosure.
Figure 8D:
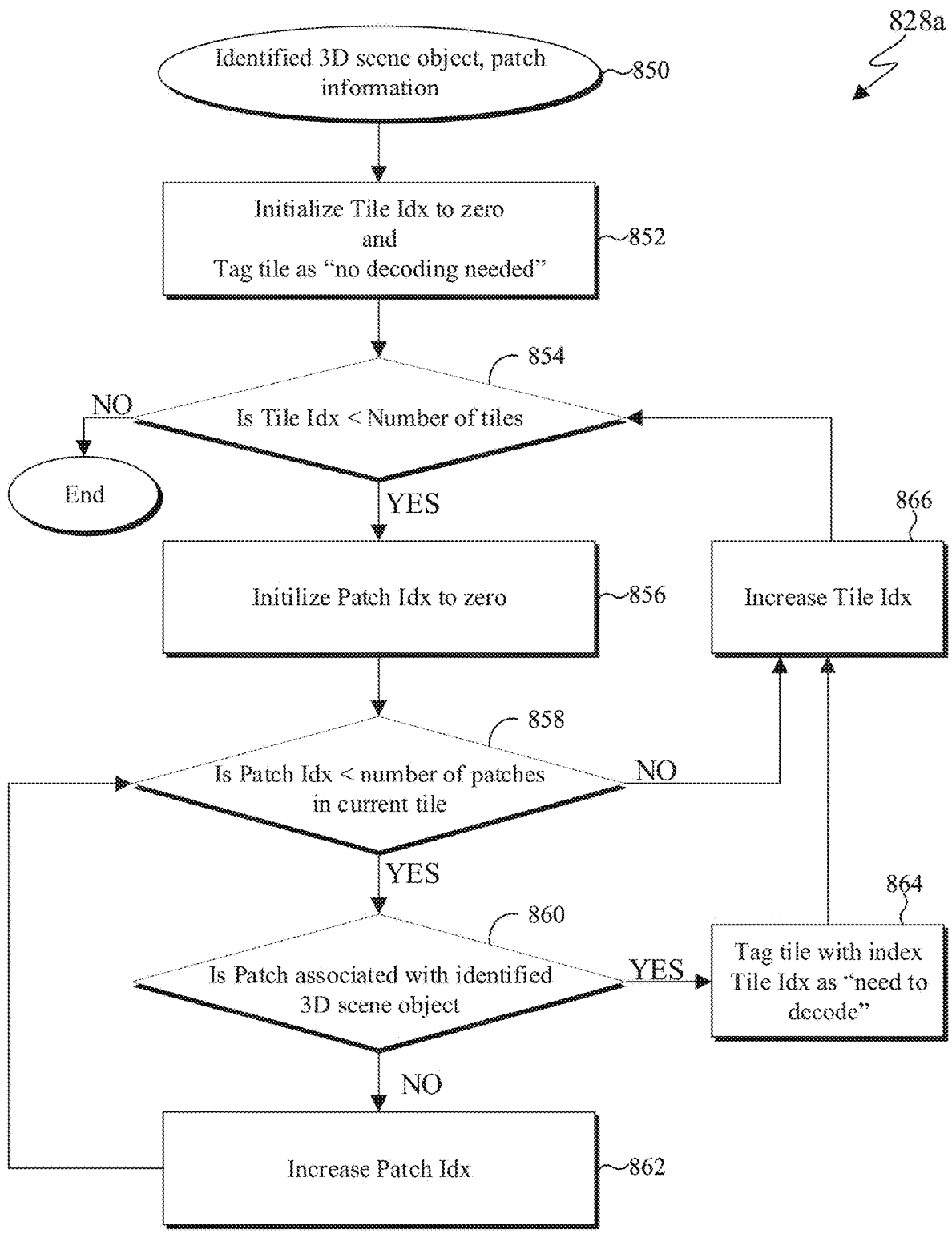
FIG. 8D illustrates an example method for identifying tiles of FIG. 8B in accordance with an embodiment of this disclosure.

FIGS. 8A and 8B illustrate example methods 800a and 800b for partial decoding of a bitstream corresponding to point cloud in accordance with an embodiment of this disclosure. FIG. 8C illustrates an example method 830 for partial reconstruction of a point cloud in accordance with an embodiment of this disclosure. FIG. 8D illustrates an example method 828a for identifying tiles from step 828 of FIG. 8B in accordance with an embodiment of this disclosure. The methods 800a, 800b, and 830 can be performed by the server 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the methods 800a, 800b, and 830 are described as being performed by the decoder 550 of FIGS. 5A and 5C.

As illustrated in FIG. 8A, the decoder 550 in step 802, initializes lists for messages, obtains a query label 804 and obtains a bitstream 806. The bitstream 806 can be similar to the bitstream 540 of FIGS. 5B and 5C. The query label 804 specifies a portion of the point cloud to decode, such as the face of the point cloud, which the point cloud represents a human. In certain embodiments, the query label 804 can be used defined. For example, the user of the decoder 550 can specify the query label. In other embodiments, the decoder 550 can identify the query label based on various criteria. For example, if the battery level of the decoder is above a certain threshold, the decoder 550 can determine to decode the entire bitstream and the query label is not obtained. For another example, based on the available processing resources of the decoder 550 and/or battery level, the decoder 550 can identify a specific query label. For instance, in a telepresence system, if the computing resources are limited or the battery level is low, the decoder 550 can decide to search for 3D objects with the label "head" (or any other label) without explicit input from the user. The query label 804 may change from one point cloud frame to the next, but in this invention we will assume that it stays the same for a V-PCC sequence.

The decoder 550 initializes the list of SEI messages. For example, at the start of the point cloud sequence, the decoder initializes the lists maintained by scene object information SEI message, object label information SEI message, and volumetric rectangle SEI message.

In step 808, the decoder 550 determines whether there is another frame to process. When there is another frame to process the decoder proceeds to step 810. Alternatively, when there are no other frames to process, the decoder proceeds to step 820.

In step 810, the decoder 550 for each point cloud frame, updates the lists corresponding to the SEI messages according to the SEI message associated with that frame. In step 812 the decoder determines that the query label 804 is present in the list of labels. When the query label 804 is present in the list of labels, the decoder 550 in step 814, identifies 3D scene objects that have the same label as the query label. For example, the decoder 550 searches through the current object labels maintained by the object label information SEI message to find a match with the query label The match may be defined as a partial match or a full match. A partial match occurs when the query label is indicates one object (such a "head") and the object label includes multiple objects including the object of the query label (such as "head and shoulders"). If a match is not found, the next point cloud frame is processed. For instance, if a match is not found, the decoder can determine not to decode any of tiles for that point cloud frame.

After identifying a 3D scene object, in step 816, the decoder identifies a volumetric region that includes the identified 3D scene object. The volumetric region can be a rectangular shape. The decoder 550 can search the volumetric rectangle information SEI message (as illustrated in FIG. 7B) to identify volumetric rectangles (regions) that correspond to the identified 3D scene object.

After identifying a rectangle (or more than one region) that correspond to the identified 3D scene object, the decoder 550 in step 818, identifies the tiles from each sub-bitstream (such as the geometry sub-bitstream 524*a*, the occupancy map sub-bitstream 526*a*, attribute sub-bitstream 530, and the atlas sub-bitstream 534*a*) that intersect (overlap) an identified region. The decoder 550 then indicates that those tiles are to be decoded. In certain embodiments, the decoder 550 also marks the tiles that are not marked to be decoded are marked as no needing to decoded. Thereafter, the decoder determines, in step 808, whether another frame needs to be processed.

Upon determining that no other frames need to be processed (by indicating regions of the frames that need to be decoded), in step 808 the decoder, in step 820, locates a nearest random access point frame that precedes the current frame from in decoding and output order. That is, the decoder (i) for each frame, (ii) for each sub-bitstream (such as the geometry sub-bitstream 524*a*, the occupancy map sub-bitstream 526*a*, attribute sub-bitstream 530, and the atlas sub-bitstream 534*a*) and (iii) for each tile tagged for decoding identifies the nearest random access point frame that precedes the current frame from in both decoding order and output order.

In step 822, the decoder 550 then marks the tiles that are located in the frames between the identified random access point frame to the current frame, in decoding order, as tiles that need to be decoded. In step 824, the decoder 550 starts decoding the identified tiles from each random access point frame to the current frame. For example, for each random access point frame of each sub-bitstream (such as the geometry sub-bitstream 524*a*, the occupancy map sub-bitstream 526*a*, attribute sub-bitstream 530, and the atlas sub-bitstream 534*a*), the decoder 550 decodes each tile identified (marked) for decoding and continues decoding the tiles until a take for that tile changes indicating that no decoding needed. The decoded tiles are the partially decoded bitstream 826.

FIGS. 8A and 8B are similar. It is noted that steps 816 and 818 are of FIG. 8A are omitted from FIG. 8B, while FIG. 8B adds new step 828 which is not included in FIG. 8A. As such, the other steps of FIGS. 8A and 8B remain unchanged.

As illustrated in the method 800*b* of FIG. 8B, in step 828, the decoder identifies a tile that corresponds to the identified 3D scene object (which was identified in step 814). To identify a tile that corresponds to the identified 3D scene object, the decoder 550 uses the patch information SEI message as illustrated and described in FIG. 7C. For example, for a first tile, such as tile 0, the decoder inspects each patch to identify whether the patch corresponds to the 3D scene object. For example, if the identified 3D scene object corresponds to object index 1, the decoder 550 inspects the objects associated with patch index 0. Upon determining that the 3D scene object is not included in the patch corresponding to the patch index 0, the decoder 550 proceeds to the next patch, identified by patch index 1. The decoder 550 determines whether object index 0 and/or object index 1 correspond to the identified 3D scene object, which is similar the query label. In this example, since the identified 3D scene object corresponds to object index 1, the decoder 550 identifies that the tile corresponding to tile index 0 includes the identified 3D scene object and selects that tile for decoding. The method 800*b* then continues similarly to the method 800*a* and generates the partially decoded bitstream 826.

As illustrated in FIG. 8C, the decoder 550 in step 832 initializes lists for messages and obtains a bitstream 806. The bitstream 806 can be similar to the bitstream 540 of FIGS. 5B and 5C. The decoder 550 initializes the list of SEI messages. For example, the decoder 550 initializes the list of tiles and patches maintained by the patch information SEI message (of FIG. 7C).

In step 834, the decoder 550 determines whether there is another frame to process. When there is another frame to process the decoder proceeds to step 836. Alternatively, when there are no other frames to process, the decoder proceeds to step 840.

In step 836, the decoder 550 for each point cloud frame, updates the list according to the patch information SEI message (of FIG. 7C) corresponding to that frame. In step 838, the decoder 550 identifies patches that correspond to the 3D object. For each patch that includes the identified object, the decoder 550 marks indicates that those patches are to be used for reconstructing the point cloud. Patches that are not marked are indicated as patches that are not to be used when reconstructing the point cloud. That is, for each 3D scene object identified as having a label matching with the query label, the patches that correspond to the 3D scene object, according to the list maintained by the patch information SEI message, are identified and tagged (and identified) as "need to reconstruct." In certain embodiments, the patches that are not tagged as "need to reconstruct" are tagged as "no reconstruction."

Upon determining that no other frames need to be processed, in step 834 the decoder, in step 840, reconstructs the points from the patches that were tagged as needing to be reconstructed. The decoder 550 using the patches that were tagged for reconstruction and from the partially decoded bitstream 826 reconstructs the indicated portions of the point cloud 842. That is, only thew points corresponding to the patches which are tagged for reconstruction are reconstructed and assigned attribute values (if present).

As shown FIGURES and 8D, the method 828*a* describes the step 828 of FIG. 8B. The step 828 obtains the identified 3D scene object (from step 814 of FIG. 8B) and patch information (step 850). The patch information can be from the patch information SEI message of FIG. 7C.

In step 852, the decoder 550 initializes the Tile Index (Idx) to zero and tags each tile of the current frame to indicate that no decoding is needed. In step 854, the decoder 550 determines whether the tile Idx is greater than the number of tiles of the frame.

When the Tile Idx is not greater than the number of tiles of the frame (such as when the current value of the Tile Idx is less than or equal to the number of tiles of the frame), the decoder 550, in step 856, initialize the Patch Idx to zero. in step 858, the decoder 550 determines whether the current Patch Idx value is greater than the number of patches in the current tile.

When the Patch Idx is not greater than the number of patches in the current tile (such as when the current value of the Patch Idx is less than or equal to the number of patches in the current frame), the decoder 550, in step 860, determines whether the current patch is associated with the identified 3D scene object (from step 814 of FIG. 8B).

When the current patch is not associated with the identified 3D scene object, the decoder 550 in step 862, increases the value of the Patch Idx. The value of Patch Idx can be increased by a value of one. after the Patch Idx value is increased, the method 828a returns to step 858 to determine whether the now increased value of Patch Idx is greater than the number of patches in the current tile.

Alternatively, when the current patch is associated with the identified 3D scene object, the decoder 550, in step 864, tags the tile as needing to be decoded.

When the decoder 550 (i) determines that the current Patch Idx value is greater than the number of patches in the current tile (step 858), or (ii) tags a tile as needing to be decoded (step 864), in step 866, the decoder increases the value of the Tile Idx. The value of the Tile Idx can be increased by one. After increasing the value of the Tile Idx, the decoder returns to step 854, to determine whether the current value of the Tile Idx is greater than the number of tiles in the frame.

Upon determining that the Tile Idx is greater than the number of tiles of the frame, the method 828a ends and the reminder of the method 800b continues. For example, upon determining that the that the Tile Idx is greater than the number of tiles of the frame as shown in the method 828a, the decoder 550 determines whether there is another frame to process (in the method 800b).

For example, the current frame can have multiple tiles, such as tile index 0, tile index 1 and tile index 2. As shown in FIG. 7C, tile index 0 includes three patches identified by patch index 0, patch index 1, and patch index 2. Each of the patches of tile 0 are associated with various objects. If the decoder 550 (in step 814) identified the 3D object as corresponding to object index 1, then the decoder 550 determines in step 860 whether any of the patches of tile index 0 are associated with that object (object index 1). For example, the decoder 550 first inspects the objects associated with patch index 0 (step 860). Since the objects associated with patch index 0 do not include the object index 1, the decoder 550, increases the value of the Patch Idx (step 862) from 0 to one. Upon returning to step 860 the decoder 550 determines whether Patch Idx 1 includes object Idx 1. As shown in FIG. 7C, Patch Idx 1 includes object Idx 1. Therefore, the decoder 550 will tag the tile 0 as needing to be decoded (step 864).

Although FIGS. 8A, 8B, 8C, and 8D illustrate examples partial decoding and partial reconstruction of a point cloud, respectively, various changes may be made to FIGS. 8A 8B, 8C, and 8D. For example, while shown as a series of steps, various steps in FIGS. 8A 8B, 8C, and 8D could overlap, occur in parallel, or occur any number of times.

Figure 9:
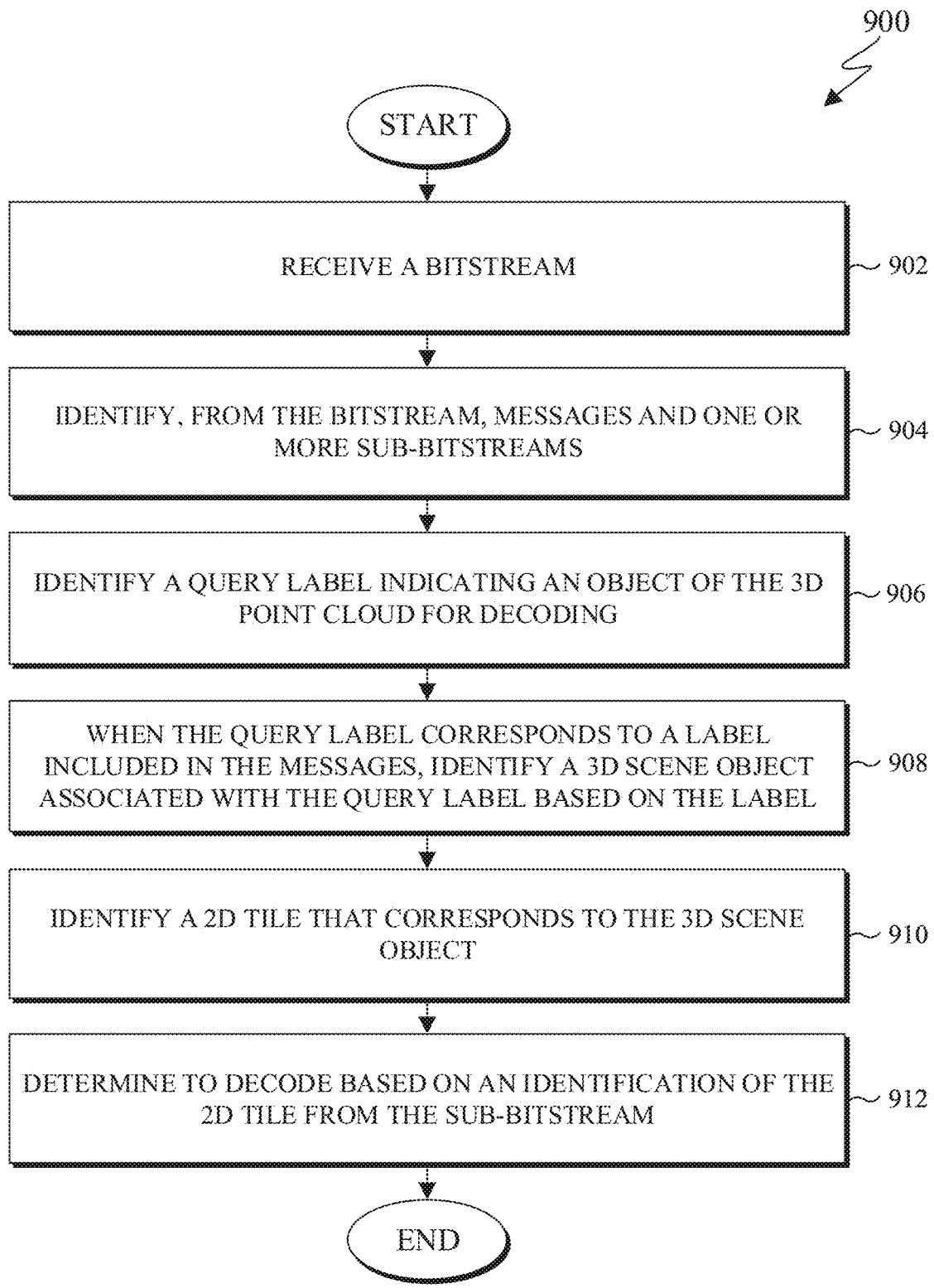
FIG. 9 illustrates an example method for decoding a point cloud in accordance with an embodiment of this disclosure.

FIG. 9 illustrates an example method 900 for decoding a point cloud in accordance with an embodiment of this disclosure. The method 900 can be performed by the server 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the method 900 is described as being performed by the decoder 550 of FIGS. 5A and 5C.

The method 900 begins with the decoder, such as decoder 550, receiving a compressed bitstream (step 902). In step 904, the decoder 550 identifies from the received bitstream messages and one or more video sub-bitstreams representing a 3D point cloud. The bitstreams can include an atlas sub-bitstream, a geometry sub-bitstream, an occupancy map sub-bitstream, and zero or more attribute sub-bitstreams. The video sub-bitstreams can include video sub-bitstreams corresponding to geometry information, and zero or more attribute information. one or more of the sub-bitstreams of the one or more sub-bitstreams includes independently encoded tiles.

The messages can include one or more messages such as the scene object information SEI message (of FIG. 7A), an object label information SEI message, a volumetric rectangle information SEI message (of FIG. 7B), and patch information SEI Message (of FIG. 7C). The scene object information SEI message includes a list of label. The object label information SEI message specifies a list of 3D scene objects. The volumetric rectangle information SEI message relates a volumetric rectangle from a list of volumetric rectangles to one or more 3D scene objects. The patch information SEI Message defines a list of tiles and corresponding patches included in each tile that is included in the current frame. The patch information SEI Message also relates the 3D scene objects to certain patches.

In step 906, the decoder 550 identifies a query label. The query label indicates an object of the 3D point cloud for decoding. In certain embodiments, to identify the query label, the decoder 550 determines that a predefined event occurs while the bitstream is received. Thereafter, the decoder 550 identifies the query label based on an application associated with the bitstream. For example, if the application is a video call, the query label could include the head of the caller.

In step 908, the decoder 550 identifies a 3D scene object that is associated with the query label in response to determining that the query label corresponds to a label of one of the messages. For example, the decoder searches through a list of labels to search for a label that matches or is similar to the query label.

In certain embodiments, the decoder 550 determines whether one label included in a list of labels, associated with the scene object information SEI message, matches the query object. Upon determining that one label included in a list of labels matches the query object, the decoder 550 identifies the 3D scene object based on the object label information SEI message.

In step 910, the decoder identifies a 2D tile that corresponds to the 3D scene object. In certain embodiments, the decoder 550 identifies a 2D rectangle from the list of volumetric rectangles that corresponds to the 3D scene object. upon identifying the 2D rectangle the decoder then identifies a 2D tile that overlaps the 2D rectangle as the 2D tile that corresponds to the 3D scene object.

In certain embodiments, the decoder 550 determines whether patch, included in one of the tiles corresponds to the identified 3D scene object. The decoder 550 then identifies the 2D tile that corresponds to the patch as the 3D tile that corresponds to the 3D object scene.

In step 912, the decoder 550 determines to decode a portion of the bitstream to generate a portion of the video frame representing a portion of the 3D scene object. The determination to decode is based on an identification of the 2D tile from the sub bitstream. In certain embodiments, the decoder 550 identifies a random access point that precedes the current frame, in order to decode a portion of the video frame, the decoder 550. The random access point corresponds to a tile on a prior frame that did not rely on a previous frame when that frame was encoded. The decoder selects (i) the current frame, (ii) the previous frame that includes the random access point, and (iii) any frames between the current frame and the previous frame that includes the random access point. The tiles from the selected frames are decoded.

In certain embodiments, after the portion of the video frame is decoded, the decoder 550 can reconstruct the portion of the point cloud. To reconstruct the point cloud, the decoder identifies one or more patches included in the decoded tile that correspond to the 3D scene object. For example, the decoder 550 can use the patch information SEI message for identifying the one or more patches. The decoder 550 then reconstructs the portion of the 3D point cloud based on the one or more patches form the decoded tile(s).

Although FIG. 9 illustrates one example of a method 900 for decoding a point cloud, various changes may be made to FIG. 9. For example, while shown as a series of steps, various steps in FIG. 9 could overlap, occur in parallel, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A decoding device for point cloud decoding, the decoding device comprising:
   a communication interface configured to receive a bitstream; and
   a processor operably coupled to the communication interface, the processor configured to:
      identify, from the bitstream, messages and one or more sub-bitstreams representing a three-dimensional (3D) point cloud, wherein a sub-bitstream of the one or more sub-bitstreams includes independently encoded tiles,
      identify a query label indicating an object of the 3D point cloud for decoding,
      in response to determining that the query label corresponds to a label included in the messages, identify a 3D scene object associated with the query label based on the label,
      identify a 2D tile that correspond to the 3D scene object, wherein the 2D tile is one of the independently encoded tiles, and
      determine to decode, based on an identification of the 2D tile from the sub-bitstream, a portion of the sub-bitstream corresponding to the 2D tile to generate a portion of a video frame representing a portion of the 3D scene object.

2. The decoding device of claim 1, wherein:
   the processor is further configured to decode the messages; and
   the messages include at least one of:
      a first message corresponding to a list of labels, including the label,
      a second message corresponding to a list of 3D scene objects, including the 3D scene object,
      a third message relating to a volumetric rectangle from a list of volumetric rectangles, wherein the volumetric rectangle is associated with one or more 3D scene objects from the list of 3D scene objects, or
      a fourth message corresponding to a list of tiles, wherein a tile from the list of tiles is associated with a list of patch information, wherein a patch from the list of patch information identifies one or more 3D scene objects associated with the list of 3D scene objects that are included in that patch.

3. The decoding device of claim 2, wherein:
   the processor is configured to identify the third message from the messages; and
   to identify the 2D tile, the processor is configured to:
      identify a 2D rectangle, from the list of volumetric rectangles, that corresponds to the 3D scene object based on the third message, and
      identify the 2D tile that overlaps the 2D rectangle.

4. The decoding device of claim 2, wherein:
   the processor is configured to identify the fourth message from the messages;
   to identify the 2D tile, the processor is configured to:
      determine whether a patch, included within a first 2D tile of the independently encoded tiles, corresponds to the 3D scene object based on the fourth message, wherein the 3D scene object matches the query label; and
      in response to determining that the patch corresponds to the 3D scene object, identify the 2D tile as the first 2D tile.

5. The decoding device of claim 2, wherein to identify a 3D scene object, the processor is configured to:
   determine that one label included in the list of labels matches the query label based on the first message, and
   identify the 3D scene object, from the list of 3D scene objects, that includes the label that matches the query label based on the second message.

6. The decoding device of claim 5, wherein the processor is further configured to:
   identify one or more patches that correspond to the 3D scene object, from the portion of the sub-bitstream corresponding to the 2D tile, based on the fourth message, and
   reconstruct a portion of the 3D point cloud based on the one or more patches.

7. The decoding device of claim 1, wherein to decode the portion of the sub-bitstream, the processor is configured to:
   identify a random access point that precedes a current frame that includes the 2D tile;
   select frames in a decoding order, from the random access point to the current frame; and
   decode the 2D tile in the selected frames.

8. The decoding device of claim 7, wherein the random access point corresponds to a portion of a frame that did not rely on another frame when encoded.

9. The decoding device of claim 1, wherein the processor is further configured to:
   determine that multiple sub-bitstreams, of the one or more sub-bitstreams, include independently encoded tiles;
   identify one or more 2D tiles from each of the multiple sub-bitstreams that correspond to the 3D scene object;
   identify a random access point that precedes a current frame and includes the one or more 2D tiles from each of the multiple sub-bitstreams; and
   select frames in a decoding order, from the random access point to the current frame from each of the one or more 2D tiles from each of the multiple sub-bitstreams for decoding.

10. The decoding device of claim 1, wherein to identify the query label, the processor is configured to:
    determine that a predefined event occurs while the bitstream is received; and
    identify the query label based on an application associated with the bitstream.

11. A method for point cloud decoding, the method comprising:
    receiving a bitstream;
    identifying, from the bitstream, messages and one or more sub-bitstreams representing a three-dimensional (3D) point cloud, wherein a sub-bitstream of the one or more sub-bitstreams includes independently encoded tiles;
    identifying a query label indicating an object of the 3D point cloud for decoding;
    in response to determining that the query label corresponds to a label included in the messages, identifying a 3D scene object associated with the query label based on the label;
    identifying a 2D tile that correspond to the 3D scene object, wherein the 2D tile is one of the independently encoded tiles; and
    determining to decode, based on an identification of the 2D tile from the sub-bitstream, a portion of the sub-bitstream corresponding to the 2D tile to generate a portion of a video frame representing a portion of the 3D scene object.

12. The method of claim 11, further comprising:
    decoding the messages,
    wherein the messages include at least one of:
       a first message corresponding to a list of labels, including the label,
       a second message corresponding to a list of 3D scene objects, including the 3D scene object,
       a third message relating to a volumetric rectangle from a list of volumetric rectangles, wherein the volumetric rectangle is associated with one or more 3D scene objects from the list of 3D scene objects, or
       a fourth message corresponding to a list of tiles, wherein a tile from the list of tiles is associated with a list of patch information, wherein a patch from the list of patch information identifies one or more 3D scene objects associated with the list of 3D scene objects that are included in that patch.

13. The method of claim 12, wherein:
    the method further comprises identifying the third message from the messages; and
    identifying the 2D tile comprises:
       identifying a 2D rectangle, from the list of volumetric rectangles, that corresponds to the 3D scene object based on the third message, and
       identifying the 2D tile that overlaps the 2D rectangle.

14. The method of claim 12, wherein:
    the method further comprises identifying the fourth message from the messages;
    identifying the 2D tile comprises:
       determining whether a patch, included within a first 2D tile of the independently encoded tiles, corresponds to the 3D scene object based on the fourth message, wherein the 3D scene object matches the query label; and
       in response to determining that the patch corresponds to the 3D scene object, identifying the 2D tile as the first 2D tile.

15. The method of claim 12, wherein identifying a 3D scene object comprises:
    determining that one label included in the list of labels matches the query label based on the first message, and
    identifying the 3D scene object, from the list of 3D scene objects, that includes the label that matches the query label based on the second message.

16. The method of claim 15, further comprising:
    identifying one or more patches that correspond to the 3D scene object, from the portion of the sub-bitstream corresponding to the 2D tile, based on the fourth message, and
    reconstructing a portion of the 3D point cloud based on the one or more patches.

17. The method of claim 11, wherein decoding the portion of the sub-bitstream comprises:
    identifying a random access point that precedes a current frame that includes the 2D tile;
    selecting frames in a decoding order, from the random access point to the current frame; and
    decoding the 2D tile in the selected frames.

18. The method of claim 17, wherein the random access point corresponds to a portion of a frame that did not rely on another frame when encoded.

19. The method of claim 11, further comprising:
    determining that multiple sub-bitstreams, of the one or more sub-bitstreams, include independently encoded tiles;
    identifying one or more 2D tiles from each of the multiple sub-bitstreams that correspond to the 3D scene object;
    identifying a random access point that precedes a current frame and includes the one or more 2D tiles from each of the multiple sub-bitstreams; and
    selecting frames in a decoding order, from the random access point to the current frame from each of the one or more 2D tiles from each of the multiple sub-bitstreams for decoding.

20. The method of claim 11, wherein identifying the query label comprises:
    determining that a predefined event occurs while the bitstream is received; and
    identifying the query label based on an application associated with the bitstream.

* * * * *